United States Patent [19]  [11] Patent Number: 6,075,106
Chen et al.  [45] Date of Patent: *Jun. 13, 2000

[54] (CO)POLYMERS BASED ON VINYL UNITS AND USE THEREOF IN ELECTROLUMINESCENT DEVICES

[75] Inventors: Yun Chen, Krefeld; Burkhard Köhler, Leverkusen; Rolf Wehrmann, Krefeld; Andreas Elschner, Mülheim; Ralf Dujardin, Willich, all of Germany

[73] Assignee: D-51368 Bayer AG, LeverKusen, Germany

[*] Notice: This patent is subject to a terminal disclaimer.

[21] Appl. No.: 08/703,797

[22] Filed: Aug. 27, 1996

Related U.S. Application Data

[63] Continuation-in-part of application No. 08/618,773, Mar. 20, 1996, Pat. No. 5,891,975.

[30] Foreign Application Priority Data

Mar. 29, 1995 [DE] Germany .......................... 195 11 484

[51] Int. Cl.$^7$ ............................ C08F 22/40; C08F 24/00

[52] U.S. Cl. .......................... 526/262; 526/262; 526/268

[58] Field of Search ..................................... 526/262, 268

[56] References Cited

U.S. PATENT DOCUMENTS

| | | | |
|---|---|---|---|
| 3,330,834 | 7/1967 | Senshu | 260/281 |
| 3,408,338 | 10/1968 | Szita et al. | |
| 3,821,383 | 6/1974 | Sestanj et al. | 424/258 |
| 4,254,109 | 3/1981 | Sestanj | 424/178 |
| 4,539,507 | 9/1985 | Vanslyke et al. | 313/504 |
| 4,598,081 | 7/1986 | Efimov et al. | 514/296 |
| 4,720,432 | 1/1988 | Vanslyke et al. | 428/457 |
| 4,769,262 | 9/1988 | Ferrar et al. | 428/35 |
| 4,769,292 | 9/1988 | Tang et al. | 428/690 |
| 5,077,142 | 12/1991 | Sakon et al. | 428/690 |
| 5,235,045 | 8/1993 | Lewis et al. | 534/560 |
| 5,286,803 | 2/1994 | Lindsay et al. | 525/329.7 |
| 5,384,378 | 1/1995 | Etzbach et al. | 526/284 |
| 5,414,069 | 5/1995 | Cumming et al. | 528/310 |
| 5,420,136 | 5/1995 | Lewis et al. | 514/296 |
| 5,587,444 | 12/1996 | Uchida et al. | 526/247 |

FOREIGN PATENT DOCUMENTS

| | | |
|---|---|---|
| 0 206 322 | 12/1986 | European Pat. Off. |
| 0 294 061 | 12/1988 | European Pat. Off. |
| 0 387 715 | 9/1990 | European Pat. Off. |
| 0 406 762 | 1/1991 | European Pat. Off. |
| 0 443 861 | 8/1991 | European Pat. Off. |
| 0 532 798 | 3/1993 | European Pat. Off. |
| 0 564 224 | 10/1993 | European Pat. Off. |
| 0 686 662 | 12/1995 | European Pat. Off. |
| 0 728 775 | 8/1996 | European Pat. Off. |
| 23 60 705 | 6/1975 | Germany . |
| WO 90/13148 | 11/1990 | WIPO . |
| WO 92/03490 | 3/1992 | WIPO . |
| WO 92/03491 | 3/1992 | WIPO . |
| WO 92/16023 | 9/1992 | WIPO . |

OTHER PUBLICATIONS

Burn et al., *Synthesis of a Segmented Conjugated Polymer Chain Giving a Blue–shifted Electoluminescence and Improved Efficiency*, J. Chem. Soc., Chem. Commun., pp. 32–34 (1992).

Tokito et al., *Polyarylenevinylene films prepared from precursor polymers soluble in organic solvents*, Polymer, vol. 31, pp. 1137–1141 (Jun., 1990).

Grem et al., *Realization of a Blue–Light–Emitting Device using Poly (p–phenylene)*, Advanced Materials 4, No. 1, pp. 36–37 (1992).

(List continued on next page.)

*Primary Examiner*—David W. Wu
*Assistant Examiner*—Tanya Zalukaeva
*Attorney, Agent, or Firm*—Connolly, Bove, Lodge & Hutz LLP

[57] ABSTRACT

The present invention relates to (co)polymers which contain at least one repeat chain unit selected from the group comprising the general formula (1) and (2) and optionally (3),

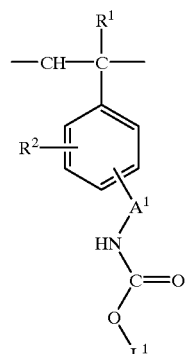

(1)

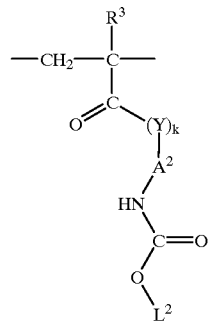

(2)

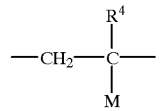

(3)

in which $L^1$ and $L^2$ mutually independently mean a photoluminescent residue.

14 Claims, No Drawings

OTHER PUBLICATIONS

Colaneri et al., *Photoexcited states in the poly (p–phenylene vinylene): Comparison with trans, trans–distyrylbenzene, a model oligomer*, Physical Review B, vol. 42, No. 18, pp. 11 670–11 681 (Dec. 15, 1990).

Von Seggern et al., *Synthesis and structure–property relations of polymers for light emitting diodes based on isolated chromophore units*, Macromol. Chem. Phys. 195, pp. 2023–2037 (1994).

P. Halliday et al., *A Study of the Elimination Reaction of Sulfonium Polyelectrolyte Precursor Polymers to Poly(p–phenylenevinylene)*, J. Chem. Soc., Chem. Commun., pp. 1685–1687 (1992).

G.E. Johnson et al., *Electroluminescence from single layer molecularly doped polymer films*, Pure & Appl. Chem., vol. 67, No. 1, pp. 175–182, (1995).

Kido et al., *Single–layer white light–emitting organic electroluminescent devices based on dye–dispersed poly(N–vinylcarbazole)*, Appl. Phys. Lett. 67 (16), pp. 2281–2283 (Oct. 16, 1995).

Pommerehne et al., *Efficient Two Layer LEDs on a Polymer Blend Basis*, Advanced Materials, (1995), 7, No. 6, pp. 551–554.

Chem. Abstr. 116:372 210725e (1992).

Chem. Abstr. 99:662 22909z (1983).

Chem. Abstr. 117:647 35794y (1992).

Chem. Abstr. 81:120 154514e (1974).

Kim et al., Synthesis and Fluorescence Behavior of Poly [ω–(1,8–naphthalimido) alkyl methacrylates] Polymer Journal vol. 26, No. 4, pp. 397–402 (1994).

Bisberg et al., *Excimer Emission and Wave Length Control from Light–Emitting Diodes Based on Side–Chain Polymers*, Macromolecules, vol. 28, No. 1, pp. 386–389 (Jan. 2, 1995).

Patent Abstracts of Japan, vol. 12, No. 230 (C–508), Abstract of JP 63023901 (Feb. 1, 1988).

Patent Abstracts of Japan, Abstract of JP 4300991 (Oct. 23, 1992).

Chem. Abstr. 120:310930u (Jun. 13, 1994).

Appl. Phys. Lett. 57, No. 6, pp. 531–533 (Aug. 6, 1990).

Orbit Abstract of DE 23 60 705 (Jun. 26, 1975).

Ai et al., CA 111:164206 (1989).

Orbit Abstract of EP 0 728 775 (Aug. 28, 1996).

Orbit Abstract of EP 0 686 662 (Dec. 13, 1995).

Derwent Abstract of SU 726,116 (Apr. 7, 1980).

Choi, D.H.; Song, S. Y.; Lim, S.J.; Park, S.Y.; Kim, N.; Synth. Met. 71(1–3), 1731–2, 1995 Abstract of R.

(CO)POLYMERS BASED ON VINYL UNITS AND USE THEREOF IN ELECTROLUMINESCENT DEVICES

This application is a Continuation in Part of the application Ser. No. 08/618,773, filed on Mar. 20, 1996, now a U.S. Pat. No. 5,891,975.

Light-emitting components for electronics and photonics are today mainly developed using inorganic semiconductors, such as gallium arsenide. Punctual display elements may be produced using such substances. Devices of a large area are not possible.

In addition to semiconductor light emitting diodes, electroluminescent devices based on vapour-deposited low molecular weight compounds are also known (U.S. Pat. No. 4,539,507, U.S. Pat. No. 4,769,262, U.S. Pat. No. 5,077,142, EP-A 406 762). With these materials too, as a consequence of the production process, it is only possible to produce small LEDs. Furthermore, these electroluminescent devices have elevated production costs and the vapour-deposited amorphous layer has a tendency to morphological change, which may cause a reduction in the intensity of electroluminescence and of the service life.

Polymers such as poly(p-phenylenes) and poly(p-phenylene-vinylenes) are described as electroluminescent: G. Leising et al., *Adv. Mater.* 4 (1992) no. 1; Friend et al, *J. Chem. Soc., Chem. Commun.* 1992, pages 32–34; Saito et al., *Polymer,* 1990, volume 31, 1137; Friend et al., *Physical Review* B, volume 42, no. 18, 11670 or WO 90/13148.

In contrast to the fully conjugated polymers, non fully conjugated polycondensation products with luminescent structural units are described in electroluminescent devices (*Macromol Chem. Phys.* 195, 2023–2037 (1994)).

Polymeric materials, in contrast with other materials, when used in an electroluminescent device, are distinguished by their good mechanical and thermal stability. Moreover, the production of emissive elements of a large surface area could also be facilitated by the possibility of casting, knife coating and spin coating the polymeric substances.

The present invention provides polymers for the production of electroluminescent devices, which polymers are based on polystyrene and polyacrylate with covalently bonded luminophoric units in the side chains, wherein attachment is achieved by urethane formation of an isocyanate-functional polymer with hydroxy-functional fluorescent dyes. Due to their simple production process and ready processability, such polymers are of technical interest with regard to use as electroluminescent materials.

The present invention relates to (co)polymers which contain at least one repeat chain unit selected from the group comprising the general formula (1) and (2) and optionally (3),

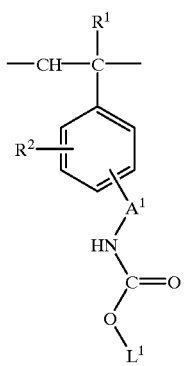

(1)

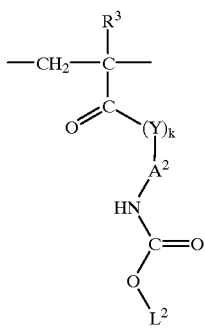

(2)

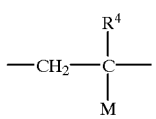

(3)

in which $R^1$, $R^3$ and $R^4$ mutually independently mean hydrogen or $C_1$–$C_6$ alkyl, $R^2$ means hydrogen, $C_1$–$C_{30}$ alkyl, $C_6$–$C_{18}$ aryl or $C_1$–$C_{30}$ alkoxy, M denotes CN or $C_1$–$C_{30}$ alkoxycarbonyl, $C_1$–$C_{30}$ (di) alkyl-aminocarbonyl, $C_1$–$C_{30}$ alkylcarbonyl, which may each be substituted by hydroxy or $C_1$–$C_6$ alkoxycarbonyl, and furthermore denotes phenyl, naphthyl, anthracenyl, pyridinyl, carbazolyl, which may each be substituted by residues selected from the group halogen, hydroxy, silyl, $C_1$–$C_{30}$ alkyl, $C_6$–$C_{18}$ aryl, $C_1$–$C_{30}$ alkoxy, $C_1$–$C_{30}$ alkoxycarbonyl, $C_1$–$C_{30}$ acyloxy and $C_1$–$C_{30}$ alkylcarbonyl, Y represents oxygen, sulfur or —$NR^\circ$—, wherein $R^\circ$ means hydrogen or $C_1$–$C_6$ alkyl, k means 0 or 1

$A^1$ and $A^2$ mutually independently mean $C_6$–$C_{18}$ arylene or $C_1$–$C_{30}$ alkylene, the aliphatic carbon chain of which may be interrupted by one to three heteroatoms such as oxygen, sulphur and/or by one to two optionally $C_1$–$C_6$ alkyl-substituted phenylenes or naphthylenes and $L^1$ and $L^2$ mutually independently mean a photoluminescent residue.

The proportion of structural units of the formula (3) is 0 to 99.5 mol. %, preferably 40 to 99.5 mol. %, and the proportion of structural units of the formula (1) and/or (2) is in each case 0.5 to 100 mol. %, preferably 0.5 to 60 mol. % and the molar proportions add up to 100.

In the above-stated formulae, $R^1$, $R^3$ and $R^4$ mutually independently preferably mean hydrogen, methyl or ethyl.

$R^2$ preferably means hydrogen, $C_1-C_6$ alkyl or phenyl optionally substituted by methyl, ethyl, n-propyl and/or iso-propyl.

M preferably denotes CN or $C_1-C_{15}$ alkoxycarbonyl, $C_1-C_{15}$ (di)alkylaminocarbonyl, $C_1-C_{15}$ alkylcarbonyl, which may each be substituted by hydroxy, methoxycarbonyl, ethoxycarbonyl, n- and/or iso-propoxycarbonyl, and furthermore denotes phenyl, naphthyl, anthracenyl, pyridinyl, carbazolyl, which may each be substituted by residues selected from the group halogen, hydroxy, silyl, $C_1-C_6$ alkyl, $C_1-C_6$ alkoxy, $C_1-C_6$ alkoxycarbonyl, $C_1-C_6$ acyloxy, $C_1-C_6$ alkylcarbonyl and phenyl optionally substituted by methyl, ethyl, n- and/or iso-propyl.

Y represents oxygen, sulfur or —NR°— wherein R° means hydrogen or $C_1-C_4$alkyl k means 0 or 1

$A^1$ and $A^2$ mutually independently preferably mean $C_6-C_{12}$ arylene, in particular phenylene or naphthylene, or $C_1-C_{12}$ alkylene, the carbon chain of which may be interrupted by one to three heteroatoms such as O, S and/or by one to two phenylenes or naphthylenes optionally substituted with $C_1-C_6$ alkyl.

$L^1$ and $L^2$ mutually independently denote a photoluminescent residue which is based on the skeleton of a fluorescent dye which is preferably selected from the group of coumarins of the formula (4)

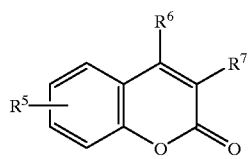

(4)

pyrenes of the formula (5)

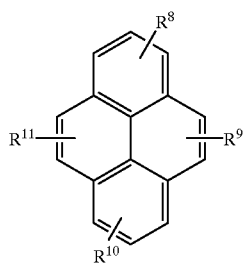

(5)

1,8-naphthalimides of the formula (6)

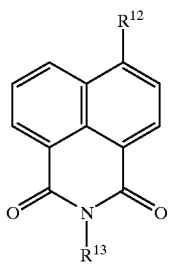

(6)

1,8-naphthaloylene-1',2'-benzimidazoles of the formula (7)

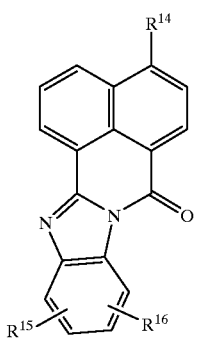

(7a)

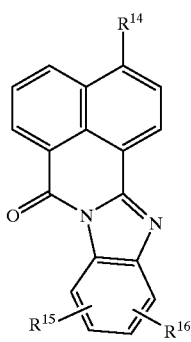

(7b)

phenothiazines or phenoxazines of the formula (8)

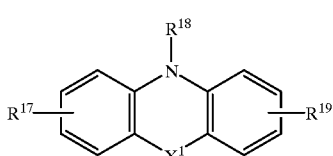

(8)

($X^1$ = O, S)

benzopyrones of the formula (9)

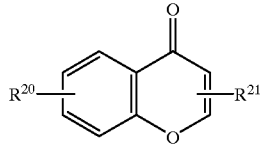
(9)

carbazoles, fluorenes, dibenzothiophenes and -furans of the formula (10)

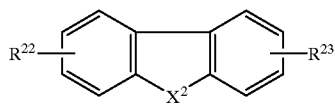
(10)

($X^2 = NR^{24}, CH_2, S, O$)

oxazoles, 1,3,4-oxadiazoles and 1,2,4-triazoles of the formula (11)

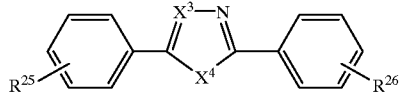
(11)

($X^3 = CH, N, X^4 = O$)

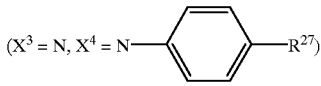
($X^3 = N, X^4 = N$—⬡—$R^{27}$)

benzoquinolines of the formula (12)

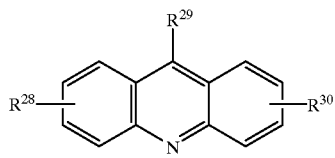
(12)

9,10-bis-(phenylethynyl)anthracenes of the formula (13)

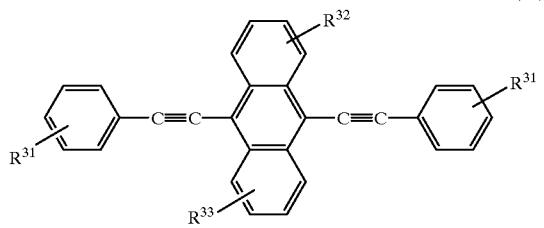
(13)

fluorones of the formula (14)

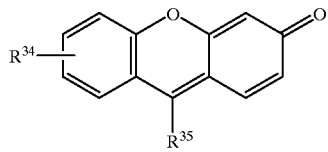
(14)

9,10-diphenylanthracene of the formula (15)

(15)

2-styrylbenzazole of the formula (16)

(16)

($X^5 = O, S, Se, CH_2$)

wherein
$R^5$ denotes hydrogen, $C_1$–$C_{30}$ alkyl, $C_6$–$C_{18}$ aryl, $C_7$–$C_{24}$ aralkyl or —$NR^{43}R^{44}$, wherein $R^{43}$ and $R^{44}$ mutually independently denote $C_1$–$C_{30}$ alkyl, $C_6$–$C_{18}$ aryl, $C_7$–$C_{24}$ aralkyl, or, together with the nitrogen atom to which they are attached, may mean a morpholine, piperidine, pyrrolidine or piperazine ring, which may bear one or two substituents from the group methyl, ethyl and phenyl, $R^6$ denotes hydrogen, cyano, $C_1$–$C_{30}$ alkyl, $C_6$–$C_{18}$ aryl or $C_7$–$C_{24}$ aralkyl, $C_1$–$C_{30}$ alkoxy, $C_1$–$C_{12}$ alkylcarbonyl, $C_1$–$C_{12}$ alkoxycarbonyl, $C_1$–$C_{12}$ (di) alkylaminocarbonyl, $R^7$ denotes hydrogen, cyano, $C_1$–$C_{30}$ alkyl, $C_6$–$C_{18}$ aryl or $C_7$–$C_{24}$ aralkyl, $C_1$–$C_{30}$ alkoxy or

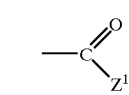

wherein $Z^1$ denotes a group $OR^{45}$ or

and
$R^{45}$, $R^{46}$ and $R^{47}$ mutually independently denote $C_1$–$C_{30}$ alkyl, $C_6$–$C_{18}$ aryl or $C_7$–$C_{24}$ aralkyl, wherein the aromatic rings may additionally be substituted by halogen, $C_1$–$C_6$ alkyl and/or $C_1$–$C_6$ alkoxy, $R^8$ to $R^{10}$ mutually independently mean hydrogen, cyano, $C_1$–$C_{30}$ alkyl, $C_6$–$C_{18}$ aryl, $C_7$–$C_{24}$ aralkyl, $C_1$–$C_{30}$ alkoxy, $C_1$–$C_{12}$ alkylcarbonyl, $C_1$–$C_{12}$ alkoxycarbonyl or an amino group with one or two $C_1$–$C_6$ alkyl groups, $R^{11}$ denotes hydrogen, cyano, $C_1$–$C_{30}$ alkyl, $C_6$–$C_{18}$ aryl, $C_7$–$C_{24}$ aralkyl, $C_1$–$C_{30}$ alkoxy, amino, $C_1$–$C_{12}$ alkylcarbonyl, $C_1$–$C_{12}$ alkoxycarbonyl or $C_1$–$C_{12}$ (di)alkylaminocarbonyl, $R^{12}$ denotes hydrogen, halogen, nitro, $C_1$–$C_4$ alkylcarbonyl, $C_1$–$C_4$ alkoxycarbonyl, $C_8$–$C_{24}$ aralkenyl, unsubstituted amino, or amino identically or differently mono- or disubstituted by $C_1$–$C_{30}$ alkyl, $C_6$–$C_{18}$ aryl or $C_7$–$C_{24}$ aralkyl, $R^{12}$ furthermore denotes morpholinyl, piperidinyl, pyrrolidinyl or piperazinyl, which may bear one or two substituents from the group methyl, ethyl and phenyl, $R^{13}$ denotes hydrogen, $C_1$–$C_{30}$ alkyl, $C_6$–$C_{18}$ aryl, $C_7$–$C_{24}$ aralkyl or $C_1$–$C_{30}$ alkoxy, $R^{14}$ denotes hydrogen, $C_1$–$C_{30}$ alkyl, $C_6$–$C_{18}$ aryl, $C_7$–$C_{24}$ aralkyl, $C_1$–$C_{30}$ alkoxy or —$NR^{48}R^{49}$, wherein $R^{48}$ and $R^{49}$ mutually independently denote $C_1$–$C_{30}$ alkyl, $C_6$–$C_{18}$ aryl, $C_7$–$C_{24}$ aralkyl or, together with the nitrogen atom to which they are attached, may mean a morpholine, piperidine, pyrrolidine or piperazine ring, which may bear one or two substituents from the group methyl, ethyl and phenyl.

$R^{15}$ and $R^{16}$ mutually independently denote hydrogen, halogen, nitro, $C_1$–$C_{30}$ alkyl, $C_6$–$C_{18}$ aryl, $C_7$–$C_{24}$ aralkyl, $C_1$–$C_{12}$ alkylcarbonyl, $C_1$–$C_{12}$ alkoxycarbonyl, $C_1$–$C_{30}$ alkoxy, $C_1$–$C_{12}$ (di)alkylaminocarbonyl, $C_1$–$C_6$ (di)alkylamino, $R^{18}$ and $R^{24}$ mutually independently denote hydrogen, $C_1$–$C_{30}$ alkyl, $C_6$–$C_{18}$ aryl and $C_7$–$C_{24}$ aralkyl and $R^{17}$, $R^{19}$ to $R^{23}$, $R^{25}$ to $R^{42}$ mutually independently denote hydrogen, cyano, $C_1$–$C_{30}$ alkyl, $C_6$–$C_{18}$ aryl, $C_7$–$C_{24}$ aralkyl, amino, $C_1$–$C_{12}$ alkylcarbonyl, $C_1$–$C_{12}$ alkoxycarbonyl, $C_1$–$C_{30}$ alkoxy, $C_1$–$C_{12}$ (di)alkylaminocarbonyl, $C_1$–$C_6$ (di)alkylamino, wherein at least one hydroxy group is located on an aliphatic carbon chain or on an aromatic ring in substituents $R^5$ to $R^{42}$ and the photoluminescent residue is attached to the polymer side chains by the reaction of this hydroxy group with an isocyanate group on residue $A^1$ or $A^2$ so forming a urethane group (—NH—COO—).

The aliphatic carbon chains in the above-stated residues $R^5$ to $R^{42}$ may be interrupted by one to three heteroatoms such as oxygen, sulphur and/or nitrogen and/or one to two phenylenes and naphthylenes optionally substituted with $C_1$–$C_6$ alkyl, preferably $C_1$–$C_4$ alkyl.

M in particular denotes phenyl, naphthyl, anthracenyl, pyridinyl, carbazolyl, which may each be substituted by hydroxy, silyl, $C_1$–$C_4$ alkyl, $C_1$–$C_4$ alkoxy, $C_1$–$C_6$ alkoxycarbonyl, $C_1$–$C_6$ acyloxy, $C_1$–$C_6$ alkylcarbonyl, phenyl optionally substituted by methyl, ethyl, n- and/or iso-propyl.

Y in particular represents oxygen or —NH—.

$A^1$ and $A^2$ in particular mutually independently denote $C_1$–$C_6$ alkylene, in which the carbon chain may be interrupted by heteroatoms selected from oxygen, sulphur and nitrogen.

$L^1$ and $L^2$ in particular mutually independently denote a fluorescent dye residue selected from the group of coumarins of the formula (4), pyrenes of the formula (5), 1,8-naphthalimides of the formula (6), 1,8-naphthaloylene-1',2'-benzimidazoles of the formula (7), phenothiazines and phenoxazines of the formula (8), carbazoles and fluorenes of the formula (10).

In the above-stated residues $R^5$ to $R^{49}$, $C_1$–$C_{30}$ alkyl preferably denotes $C_1$–$C_{16}$ alkyl, in particular $C_1$–$C_{12}$ alkyl, $C_6$–$C_{18}$ aryl, $C_7$–$C_{24}$ aralkyl preferably denote phenyl, naphthyl, phenyl-$C_1$–$C_4$-alkyl or naphthyl-$C_1$–$C_4$-alkyl optionally substituted by halogen, $C_1$–$C_6$ alkyl, preferably $C_1$–$C_4$ alkyl and/or $C_1$–$C_6$ alkoxy, preferably $C_1$–$C_4$ alkoxy, $C_1$–$C_{30}$ alkoxy preferably denotes $C_1$–$C_{16}$ alkoxy, in particular $C_1$–$C_{12}$ alkoxy, $C_1$–$C_{12}$ alkylcarbonyl, $C_1$–$C_{12}$ alkoxycarbonyl and $C_1$–$C_{12}$ (di)alkylaminocarbonyl preferably denote $C_1$–$C_8$ alkyl-carbonyl, $C_1$–$C_8$ alkoxycarbonyl and $C_1$–$C_8$ (di)alkylamino-carbonyl, $C_8$–$C_{24}$ aralkenyl preferably denotes phenyl-$C_2$–$C_{16}$-alkenyl or naphthyl-$C_2$–$C_{16}$-alkenyl, in particular phenyl-$C_2$–$C_{12}$-alkenyl or naphthyl-$C_2$–$C_{12}$-alkenyl, $C_1$–$C_6$-(di)alkylamino preferably denotes $C_1$–$C_4$-(di)alkylamino.

The alkyl substituents on aromatic rings are in particular methyl, ethyl, n- or i-propyl, n-, iso- or tert.-butyl.

The present invention furthermore relates to a process for the production of the above-stated (co)polymers which contain at least one repeat chain unit of the general formula (1) or (2) and optionally repeat units of the general formula (3),

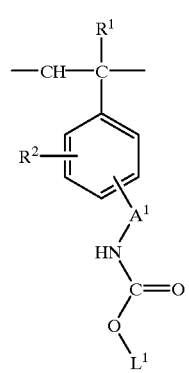

(1)

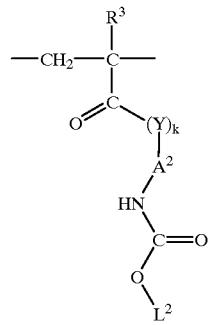

(2)

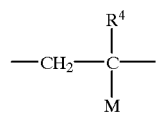

(3)

in which $R^1$, $R^2$, $R^3$, $R^4$, M, Y, k, $A^1$, $A^2$, $L^1$ and $L^2$ have the above-stated range of meaning and the proportion of structural units of the formulae have the above-stated meaning, characterised in that a fluorescent dye of the formula (17) functionalised with a hydroxy group $$L^1\text{---}OH \text{ or } L^2\text{---}OH \quad (17)$$

wherein $L^1$ and $L^2$ have the above-stated meaning, is reacted with a (co)polymer which contains at least one of the repeat chain units of the general formula (18) or (19) and optionally repeat units of the general formula (3),

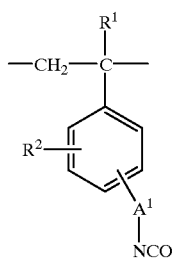
(18)

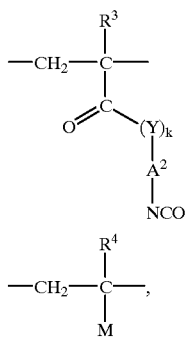
(19)

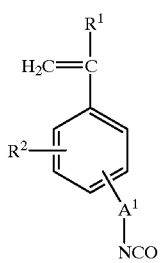
(3)

in which $R^1$, $R^2$, $R^3$, $R^4$, M, Y, k, $A^1$ and $A^2$ have the above-stated range of meaning and the proportion of structural units of the formulae have the above-stated meaning, with catalysis by, for example, a tertiary amine, such as for example triethylamine, tributylamine or diazabicyclo-[2.2.2.]octane, or an organotin compound, such as for example dibutyltin oxide or dibutyltin dilaurate, in the presence of a diluent, such as for example benzene, toluene, xylene, mesitylene, chlorobenzene, tetrahydrofuran, dioxane, ethyl acetate, 1-methoxy-2-propyl acetate, dichloromethane, 1,2-dichloroethane or chloroform at temperatures of 20 to 250° C., preferably of 40 to 150° C.

The above-stated (co)polymers with the repeat chain unit of the general formula (18) or (19) and optionally with that of the general formula (3) may be produced in a polymerisation reaction from the corresponding monomers (20), (21) and (22) based on a vinyl unit

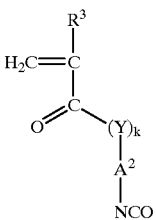
(20)

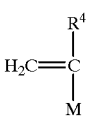
(21)

(22)

$$H_2C=\overset{R^4}{\underset{M}{C}}$$

in which $R^1$ to $R^4$, M, Y, k $A^1$ and $A^2$ have the above-stated range of meaning.

Such polymerisation reactions are described in the literature. They may proceed by ionic or free-radical polymerisation. Anionic polymerisation may be initiated, for example, by initiators such as butyllithium or lithiumnapthalide. Free-radical polymerisation may be initiated by, for example, free-radical initiators, such as for example azo initiators or peroxides, preferably AIBN (azoisobutyronitrile) or dibenzoyl peroxide. The polymers may be produced using bulk methods or in suitable solvents such as benzene, toluene, tetrahydrofuran, dioxane, ethyl acetate, xylene, chlorobenzene, 1-methoxy-2-propyl acetate, chlorinated hydrocarbons, acetone, at temperatures of 20 to 250° C.

Production of the (co)polymers according to the invention is illustrated by way of example by the following reaction scheme:

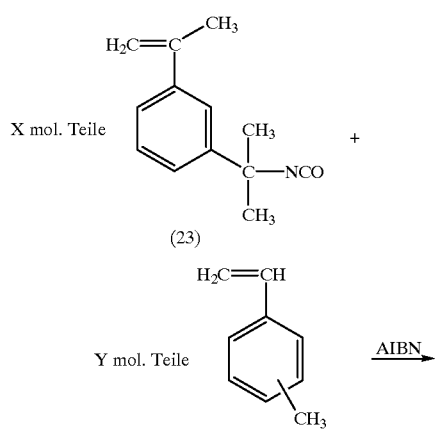
(23)
(24)

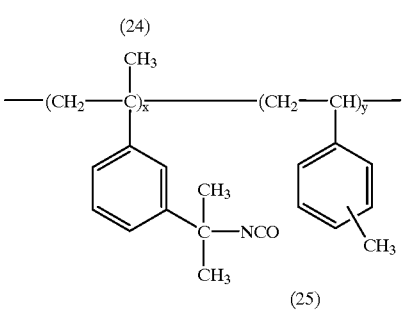
(25)

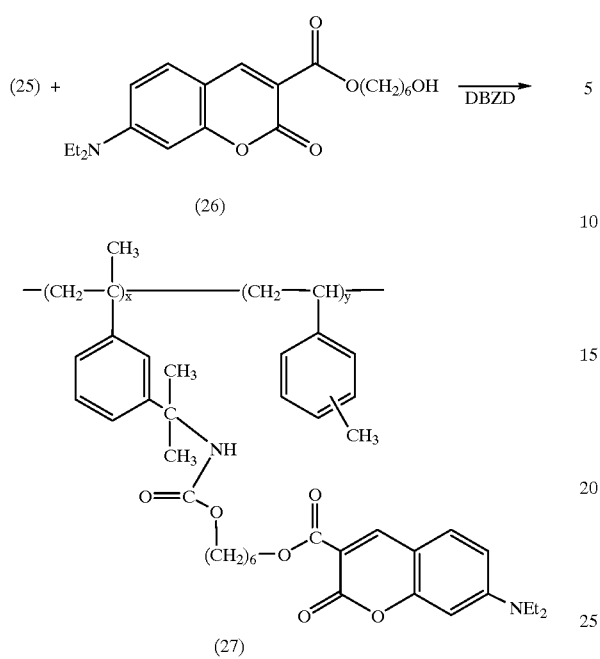

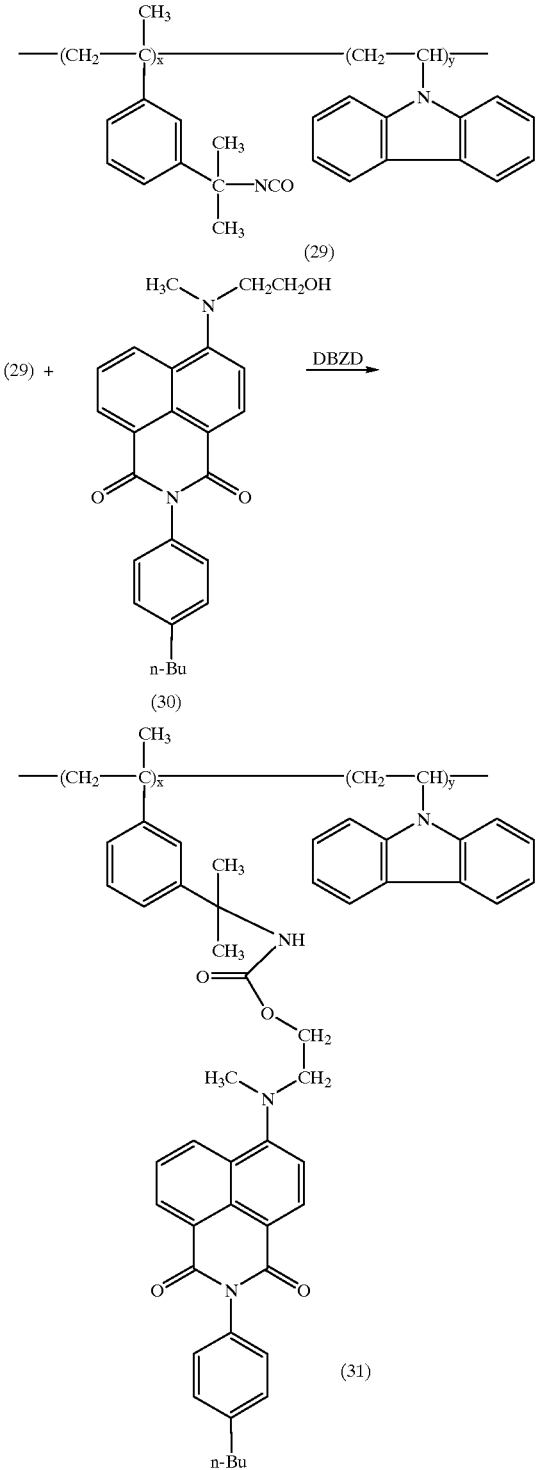

In this scheme, m-(2-isocyanatoprop-2-yl)-α-methylstyrene (23) and m/p-methylstyrene (24) are polymerised under the action of AIBN as free-radical initiator in toluene at 100 to 110° C. to yield the copolymer (25). The preferred molar proportion x of comonomer (23) is between 0 and 60%. The copolymer (25) obtainable in this manner reacts with 3-(6-hydroxyhexoxycarbonyl)-7-diethylaminocoumarin (26) in the presence of catalytic quantities of dibutyltin dilaurate (DBZD) in refluxing methylene chloride, wherein the copolymer (27) may be obtained with a lateral coumarin luminophore (Et=ethyl).

The (co)polymers of the stated type may also be produced, for example, in accordance with the following reaction scheme:

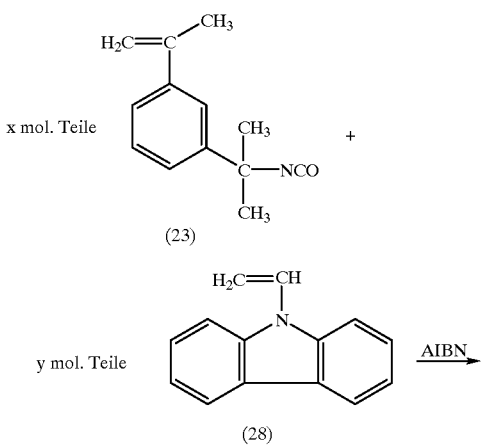

In this scheme, the copolymer (31) with a lateral 1,8-naphthalimide luminophore is obtained in a similar manner to the method described above from N-(4-butylphenyl)-4-(N'-methyl-N'-hydroxyethyl)amino-1,8-naphthalimide (30) and the polymer (29), which may be produced by free-radical copolymerisation from m-(2-isocyanatoprop-2-yl)-α-methylstyrene (23) and N-vinyl-carbazole (28) in toluene at 100 to 110° C. (Bu=butyl).

The (co)polymers of the stated type may also be produced, for example, in accordance with the following reaction scheme:

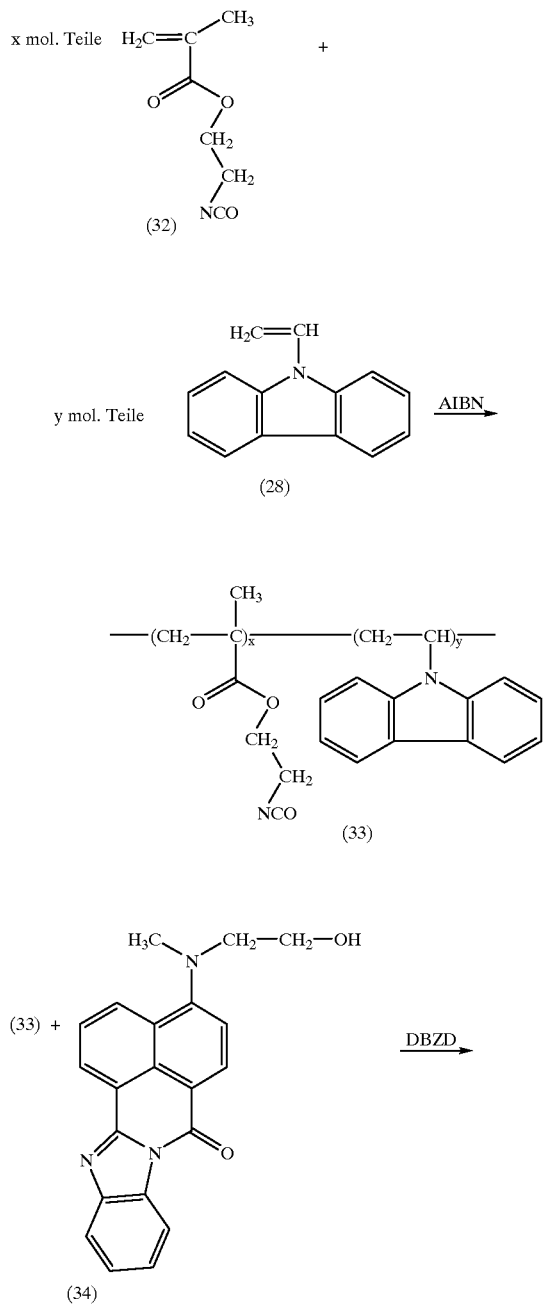

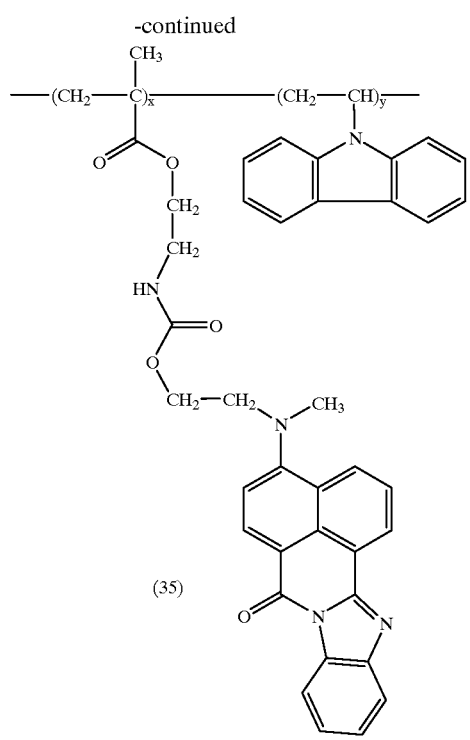

In this scheme, the copolymer (35) with a lateral 1,8-naphthoylene-1',2'-benzimidazole luminophore is obtained in a similar manner to the method described above from 4/5-(N-methyl-N-hydroxyethyl)amino-1,8-naphthoylene-1', 2'-benzimidazole (34) (only the 4 isomer is shown) and the polymer (33), which may be produced by free-radical copolymerisation from 2-isocyanatoethyl methacrylate (32) and N-vinylcarbazole (28) in 1-methoxy-2-propyl acetate toluene at 100 to 110° C.

(Co)polymers of the present invention have molecular weights, determined by gel permeation chromatography, in the range from 1000 to 1 million g/mol, preferably of 5000 to 500000 g/mol.

Some of the hydroxy-functionalised fluorescent dyes (cf. definition of the residue L) required for production of (co)polymers according to the invention are known.

The coumarin derivatives of the following formula (4a) are novel:

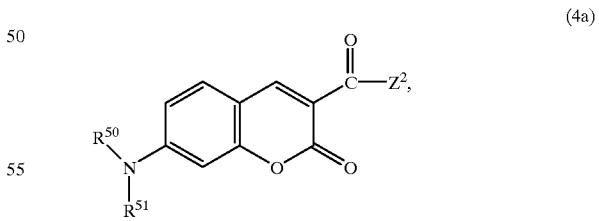

wherein

- $R^{50}$ and $R^{51}$ mutually independently denote hydrogen, $C_1–C_{30}$ alkyl, $C_6–C_{18}$ aryl or $C_6–C_{24}$ aralkyl, which may each be substituted by hydroxy, amino, carboxy and/or $C_1–C_4$ alkoxycarbonyl or

- $R^{50}$ and $R^{51}$, together with the nitrogen atom to which they are attached, may mean a morpholine, piperidine, pyrrolidine or piperazine ring, which may bear one or two substituents from the group methyl, ethyl and phenyl, and

- $Z^2$ denotes a group $OR^{52}$ or $—NR^{53}R^{54}$, wherein

- $R^{52}$ means $C_1–C_{30}$ alkyl, $C_6–C_{18}$ aryl or $C_6–C_{24}$ aralkyl, which are each substituted by at least one hydroxy group and wherein the aromatic rings may additionally be substituted by halogen, $C_1–C_6$ alkyl and/or $C_1–C_6$ alkoxy and

- $R^{53}$ and $R^{54}$ mutually independently denote $C_1–C_{30}$ alkyl, $C_6–C_{18}$ aryl, $C_6–C_{24}$ aralkyl, each optionally hydroxy-substituted, wherein at least one of the residues $R^{53}$ and $R^{54}$ has a hydroxy group and wherein the aromatic rings may additionally be substituted by halogen, $C_1–C_6$ alkyl and/or $C_1–C_6$ alkoxy.

The coumarin derivatives of the formula (4a) according to the invention bear at least one hydroxy group by means of which they may be chemically bonded to the polymer side chains.

In the formula (4a), $R^{50}$ and $R^{51}$ mutually independently preferably denote hydrogen or $C_1–C_{16}$ alkyl, optionally substituted by hydroxy, amino, carboxy and/or $C_1–C_4$ alkoxycarbonyl, or phenyl, naphthyl, phenyl-$C_1–C_4$-alkyl or naphthyl-$C_1–C_4$-alkyl each unsubstituted or substituted by $C_1–C_4$ alkyl, hydroxy, amino, carboxy and/or $C_1–C_4$ alkoxycarbonyl, chlorine and/or bromine.

- $R^{50}$ and $R^{15}$ in particular denote $C_1–C_6$ alkyl or phenyl optionally substituted by hydroxy, amino and/or carboxy.

$Z^2$ in the above-stated formula (4a) denotes $—OR^{52}$ or $—NR^{53}R^{54}$, wherein

- $R^{52}$ preferably denotes $C_1–C_{16}$ alkyl, phenyl, naphthyl, phenyl-$C_1–C_4$-alkyl or naphthyl-$C_1–C_4$-alkyl, which are each substituted by at least one hydroxy group, and wherein the aromatic rings may additionally be substituted by halogen, $C_1–C_{16}$ alkyl and/or $C_1–C_6$ alkoxy,

- $R^{53}$ and $R^{54}$ mutually independently denote $C_1–C_{16}$ alkyl, phenyl, naphthyl, phenyl-$C_1–C_4$-alkyl, naphthyl-$C_1–C_4$-alkyl, each optionally substituted by hydroxy, wherein at least one of the residues $R^{53}$ and $R^{54}$ has a hydroxy group and wherein the aromatic rings may additionally also be substituted by halogen, $C_1–C_6$ alkyl and/or $C_1–C_6$ alkoxy.

- $R^{52}$ particularly preferably denotes a $C_1–C_{12}$ alkyl substituted by a hydroxy group.

- $R^{53}$ and $R^{54}$ mutually independently particularly preferably denote $C_1–C_{12}$ alkyl optionally substituted by a hydroxy group, wherein at least one of the residues $R^{53}$ and $R^{54}$ has a hydroxy group.

The novel coumarin derivatives of the formula (4a),

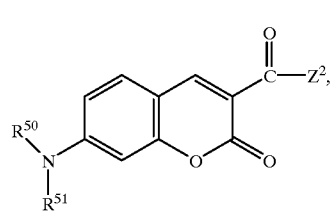

(4a)

wherein $R^{50}$, $R^{51}$ and $Z^2$ have the above-stated meaning, may be produced by, a) in the event that $Z^2$ denotes $—OR^{52}$, producing the malonic acid derivative of the formula (III)

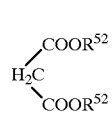

(III)

preferably in a single vessel process from the Meldrum's acid of the formula (I)

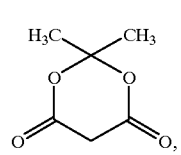

(I)

and an alcohol of the formula (II)

$R^{52}—OH$ (II)

optionally in the presence of a diluent, such as for example toluene, xylene or mesitylene with catalysis by, for example, p-toluenesulphonic acid at temperatures in the range from 20 to 250° C., preferably from 80 to 150° C., and then reacting this malonic acid derivative with a salicylic aldehyde of the formula (IV)

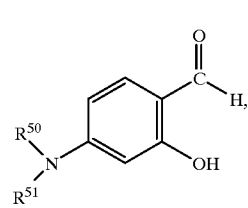

(IV)

wherein $R^{50}$, $R^{51}$ and $R^{52}$ have the above-stated meaning, optionally in the presence of a diluent, such as for example toluene, xylene, mesitylene, with catalysis by, for example, piperidine acetate at temperatures of 50 to 250° C., preferably of 80 to 140° C., and, b) in the event that $Z^2$ denotes $—NR^{53}R^{54}$, by reacting a salicylic aldehyde of the formula (IV) with a secondary amine of the formula (V) and a malonic acid derivative of the formula (VI)

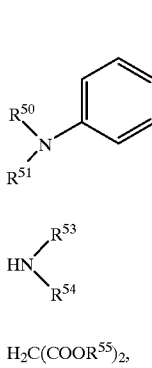

H₂C(COOR⁵⁵)₂,   (VI)

wherein $R^{50}$, $R^{51}$, $R^{53}$ and $R^{54}$ have the above-stated meaning and $R^{55}$ denotes $C_1$–$C_6$ alkyl,
optionally in the presence of a diluent, such as for example toluene, xylene or mesitylene, with catalysis by, for example, piperidine acetate at temperatures of 50 to 250° C., preferably of 80 to 140° C.

When performing the process a) according to the invention, 2 to 10 mol, preferably 3 to 6 mol of alcohol of the formula (II) are generally used for each mol of compound of the formula (I), and 0.5 to 1 mol, preferably 0.9 to 1 mol of salicylic aldehyde of the formula (IV) is generally used per mol of compound of the formula (III).

When performing the process b) according to the invention, 2 to 20 mol, preferably 5 to 10 mol of secondary amine of the formula (V) and 1 to 2 mol, preferably 1.2 to 1.5 mol of malonic acid derivative of the formula (VI) are generally used per mol of compound of the formula (IV).

Production of the coumarin derivatives of the formula (4a), where $Z^2=OR^{52}$, by way of a Knoevenagel condensation reaction and subsequent cyclisation is illustrated by way of example by the following reaction scheme:

In this scheme, bis-(6-hydroxyhexyl) malonate is first produced by reacting the Meldrum's acid and 1,6-hexanediol in the presence of a catalytic quantity of p-toluene-sulphonic acid with elimination of acetone and water. The bis-(6-hydroxyhexyl) malonate is then combined with 4-diethylaminosalicylic aldehyde in the presence of catalytic quantities of piperidine acetate to form the desired 3-(6-hydroxyhexoxycarbonyl)-7-diethylaminocoumarin Production of the coumarin derivatives of the formula (4a), where $Z^2=-NR^{53}R^{54}$, is illustrated by way of example by the following reaction scheme:

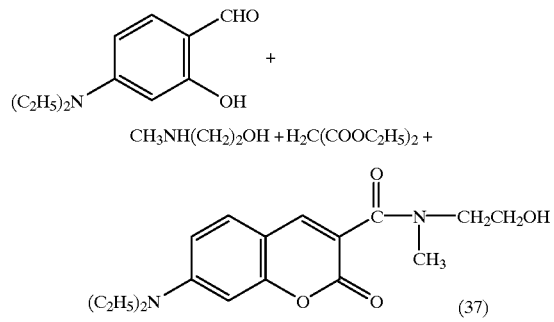

In this scheme, 4-diethylaminosalicylic aldehyde is reacted with diethyl malonate and 2-(methylamino)ethanol in the presence of catalytic quantities of piperidine acetate. The desired 3-[(N-hydroxyethyl-N-methyl)aminocarbonyl]-7-diethylaminocoumarin is obtained.

The starting products of the formulae (I), (II), (III), (IV), (V) and (VI) are compounds which are generally known in organic chemistry.

The 1,8-naphthalimide derivatives of the following formulae (6a), (7a-1) and (7b-1) are also novel:

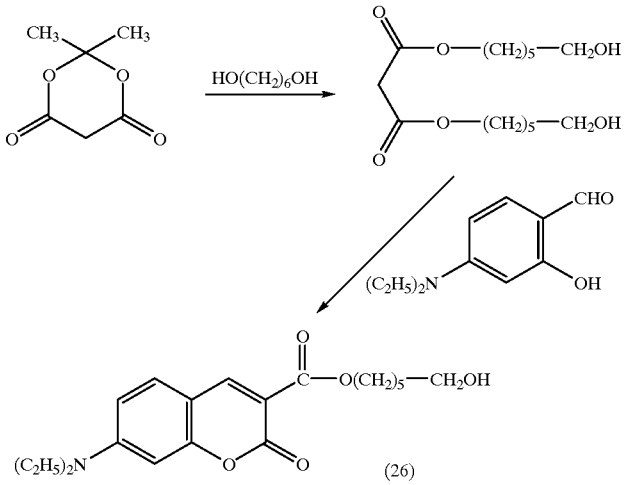

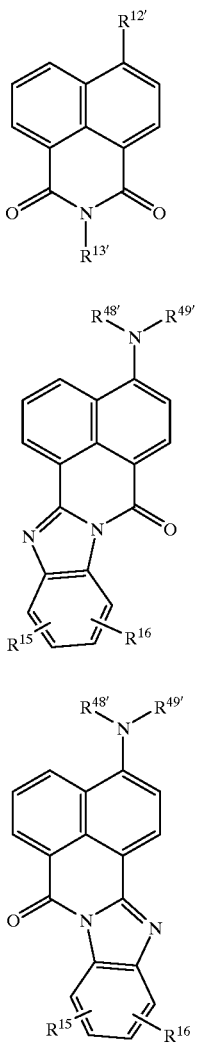

in which
R$^{12'}$ denotes hydrogen, halogen, nitro, C$_1$–C$_4$ alkoxycarbonyl, C$_1$–C$_4$ acyl, C$_8$–C$_{24}$ aralkenyl, unsubstituted amino or amino identically or differently mono- or disubstituted by C$_1$–C$_{30}$ alkyl, C$_6$–C$_{18}$ aryl, C$_6$–C$_{24}$ aralkyl, wherein the above-stated carbon chains may themselves be substituted by hydroxy, R$^{12'}$ furthermore denotes morpholinyl, piperidinyl, pyrrolidinyl or piperazinyl, which may bear one or two substituents selected from methyl, ethyl and/or phenyl, R$^{13'}$ denotes hydrogen or C$_1$–C$_{30}$ alkyl, C$_1$–C$_{30}$ alkoxy, C$_6$–C$_{18}$ aryl or C$_6$–C$_{24}$ aralkyl, which may be mono- or polysubstituted by hydroxy, and at least one of the residues R$^{12'}$ and R$^{13'}$ has a hydroxy group, R$^{48'}$ and R$^{49'}$ mutually independently denote C$_1$–C$_{30}$ alkyl, C$_6$–C$_{18}$ aryl, C$_6$–C$_{24}$ aralkyl, which may be substituted by hydroxy, R$^{48'}$ and R$^{49'}$, together with the nitrogen atom to which they are attached, moreover denote morpholinyl, piperidinyl, pyrrolidinyl or piperazinyl, which may bear one or two identical or different substituents selected from methyl, ethyl and phenyl, wherein at least one of the residues R$^{48'}$ and R$^{49'}$ has a hydroxy group and, R$^{15}$ and R$^{16}$ have the above-stated meaning.

The 1,8-naphthalimide derivatives of the formulae (6a), (7a-1) and (7b-1) according to the invention bear at least one hydroxy group, by means of which they may be chemically bonded to the polymer side chains.

In the above-stated formula (6a),

R$^{12'}$ preferably denotes hydrogen, chlorine, bromine, nitro, methoxycarbonyl, ethoxycarbonyl, n- or iso-propoxy-carbonyl, methylcarbonyl, ethylcarbonyl, n- or iso-propylcarbonyl, amino, amino identically or differently mono- or disubstituted by C$_1$–C$_{15}$ alkyl, or phenyl, naphthyl, phenyl-C$_1$–C$_4$-alkyl or naphthyl-C$_1$–C$_4$-alkyl, in each case optionally substituted by methyl and/or ethyl, wherein the above-stated carbon chains may themselves by substituted by hydroxy, R$^{12'}$ furthermore preferably denotes morpholinyl, piperidinyl, pyrrolidinyl or piperazinyl, which may bear one or two substituents selected from methyl, ethyl and phenyl, R$^{13'}$ preferably denotes hydrogen or C$_1$–C$_{15}$ alkyl, phenyl or phenyl-C$_1$–C$_4$-alkyl, which may be substituted by hydroxy and the aromatic rings may additionally also be substituted by halogen, C$_1$–C$_6$ alkyl and/or C$_1$–C$_6$ alkoxy.

R$^{12'}$ in particular denotes chlorine, bromine, amino which is identically or differently mono- or disubstituted by C$_1$–C$_{15}$ alkyl, morpholinyl, piperidinyl, pyrrolidinyl or piperazinyl, wherein the above-stated carbon chains may themselves by substituted by hydroxy, R$^{13'}$ in particular denotes C$_1$–C$_{12}$ alkyl, phenyl optionally substituted by halogen, C$_1$–C$_6$ alkyl and/or C$_1$–C$_6$ alkoxy, which may bear a hydroxy group.

At least one of the residues R$^{12'}$ and R$^{13'}$ must have a hydroxy group.

R$^{48'}$ and R$^{49'}$ in the formulae (7a-1) and (7b-1) mutually independently preferably denote C$_1$–C$_{15}$ alkyl, phenyl, naphthyl, phenyl-C$_1$–C$_4$-alkyl, naphthyl-C$_1$–C$_4$-alkyl, which may be mono- or poly-, in particular monosubstituted by hydroxy, R$^{48'}$ and R$^{49'}$, together with the nitrogen atom to which they are attached, moreover preferably denote piperidinyl or piperazinyl, which may bear one or two identical or different substituents selected from methyl, ethyl and phenyl.

At least one of the residues R$^{48'}$ and R$^{49'}$ must have a hydroxy group.

R$^{15}$ and R$^{16}$ in the formulae (7a-1) and (7b-1) mutually independently preferably denote hydrogen, halogen, C$_1$–C$_{15}$ alkyl, C$_1$–C$_{15}$ alkoxy, C$_1$–C$_4$ alkoxycarbonyl, C$_1$–C$_4$ acyl, C$_1$–C$_6$ (di)alkylamino, or phenyl, naphthyl, phenyl-C$_1$–C$_6$-alkyl, naphthyl-C$_1$–C$_6$-alkyl in each case substituted by methyl and/or ethyl.

R$^{48'}$ and R$^{49'}$ in particular denote C$_1$–C$_{12}$ alkyl, phenyl, phenyl-C$_1$–C$_6$ alkyl, which may be substituted by hydroxy, wherein at least one of the residues R$^{48'}$ and R$^{49'}$ has a hydroxy group.

R$^{15}$ and R$^{16}$ in particular denote hydrogen, halogen, C$_1$–C$_{12}$ alkyl, C$_1$–C$_{12}$ alkoxy, C$_1$–C$_6$ (di)alkylamino, phenyl.

The number of hydroxy groups is at least one, but there may also be up to four hydroxy groups.

The aromatic rings in the above-stated residues may be identically or differently mono- to penta-, preferably mono- to trisubstituted by the stated substituents.

A process for the production of 1,8-naphthalimide derivatives of the formula (6a)

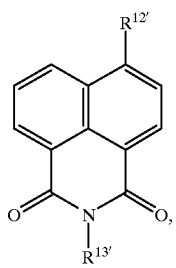
(6a)

wherein $R^{12'}$ and $R^{13'}$ have the above-stated meaning, is characterised in that either A) a 1,8-naphthalic anhydride of the formula (VII) and a primary amine of the formula (VIII),

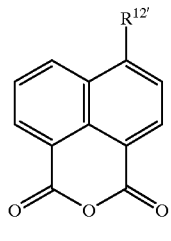
(VII)

R$^{13'}$—NH$_2$, (VIII)

wherein $R^{12'}$ and $R^{13'}$ have the above-stated meaning, are reacted together at temperatures of 50 to 250° C., preferably of 90 to 140° C., in the presence of diluents, such as for example acetic acid, butanol, chlorobenzene, toluene or xylene or, B) in the event that $R^{12'}$ in formula (6a) means a mono- or disubstituted amino or cyclic amino, a 1,8-naphthalimide of the formula (6a-1)

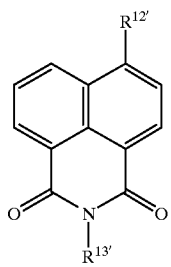
(6a-1)

in which $R^{12''}$ denotes halogen, preferably chlorine, bromine or iodine, or nitro, and $R^{13'}$ has the above-stated meaning, which is produced from a 1,8-naphthalic anhydride of the formula (VIIa) and a primary amine of the formula (VIII)

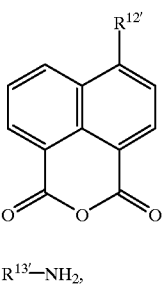
(VIIa)

R$^{13'}$—NH$_2$, (VIII)

wherein $R^{2''}$ and $R^{13'}$ have the above stated meaning, at temperatures of 50 to 250° C., preferably of 90 to 140° C., in the presence of a diluent, such as for example acetic acid, butanol, chlorobenzene, toluene or xylene, and the resultant compound of the formula (6a-1) is then reacted with a primary or secondary amine or a cyclic secondary amine of a structure corresponding to that of $R^{12'}$, optionally in the presence of a solvent, such as for example methoxyethanol or butanol, with catalysis by, for example, a copper(II) salt at temperatures of 50 to 250° C., preferably of 100 to 150° C.

A process for the production of 1,8-naphthalimide derivatives of the formula (7a-1) and (7b-1) (process C),

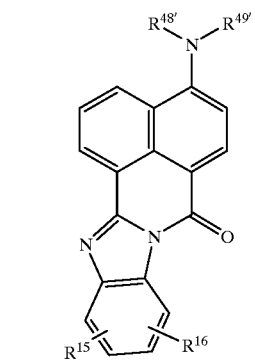
(7a-1)

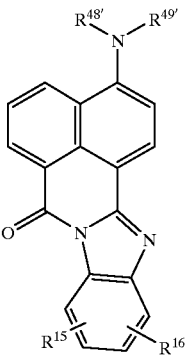
(7b-1)

wherein $R^{15}$, $R^{16}$, $R^{48'}$ and $R^{49'}$ have the above-stated meaning, is characterised in that a 1,8-naphthalimide derivative of the formula (IXa and b),

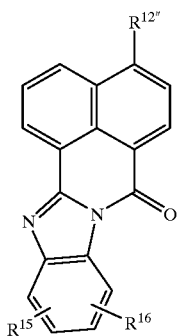
(IXa)

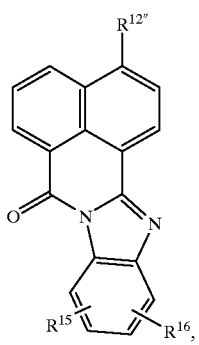
(IXb)

wherein $R^{15}$, $R^{16}$ and $R^{12''}$ have the above-stated meaning, is produced from a 1,8-naphthalic anhydride of the formula (VIIa)

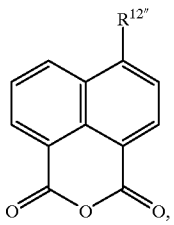
(VIIa)

wherein $R^{12''}$ has the above-stated meaning,
and an o-phenylenediamine of the formula (X)

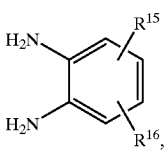
(X)

wherein $R^{15'}$ and $R^{16}$ have the above-stated meaning, at temperatures of 50 to 250° C., preferably of 90 to 140° C., in the presence of a diluent, such as for example acetic acid, butanol, chlorobenzene, toluene or xylene and the 1,8-naphthalimide derivative of the formula (IXa and b) is then reacted with a secondary amine of the formula (XI),

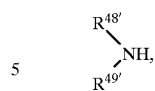
(XI)

wherein $R^{48'}$ and $R^{49'}$ have the above-stated meaning, optionally in the presence of a solvent, such as for example methoxyethanol or butanol, with catalysis by, for example, a copper(II) salt at temperatures of 50 to 250° C., preferably of 100 to 150° C.

When performing the process (A) according to the invention for the production of the 1,8-naphthalimide derivatives of the formula (6a), 1 to 1.8 mol, preferably 1.2 to 1.4 mol of primary amine of the formula (VIII) are generally used per mol of compound of the formula (VII).

When performing the process (B) according to the invention for the production of the 1,8-naphthalimide derivatives of the formula (6a), 1 to 1.8 mol, preferably 1.2 to 1.4 mol of the primary amine of the formula (VIII) are generally used per mol of compound of the formula (VIIa) and 1.2 to 5 mol, preferably 2 to 2.5 mol of the corresponding primary, secondary or cyclic amine are used per mol of compound of the formula (6a-1).

Production of the 1,8-naphthalimide derivatives of the formula (6a), processes (A) and (B), according to the invention is illustrated by way of example by the following reaction scheme:

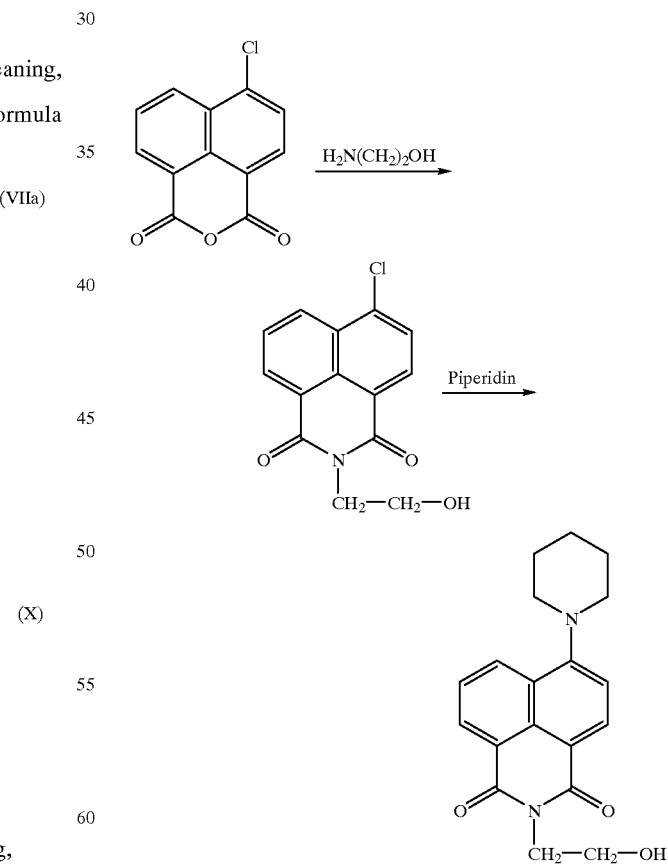

In this scheme, the 4-chloro-N-hydroxyethyl-1,8-naphthalimide is first produced by the reaction of 4-chloronaphthalic anhydride and 2-aminoethanol. The 4-chloro-N-hydroxyethyl-1,8-naphthalimide is then combined with piperidine in the presence of a catalytic quantity of a copper(II) salt to form the desired N-hydroxyethyl-4-piperidino-1,8-naphthalimide.

When performing the process (C) according to the invention for the production of the 1,8-naphthalimide derivatives of the formula (7a-1) and (7b-1), 1 to 1.8 mol, preferably 1.2 to 1.4 mol of the o-phenylenediamine of the formula (X) are generally used per mol of compound of the formula (VIIa) and 1.2 to 5 mol, preferably 2 to 2.5 mol of the secondary amine of the formula (XI) are generally used per mol of compound (IXa-b).

Production of the 1,8-naphthalimide derivatives according to the invention of the formulae (7a-1 and 7b-1) is illustrated by way of example by the following reaction scheme:

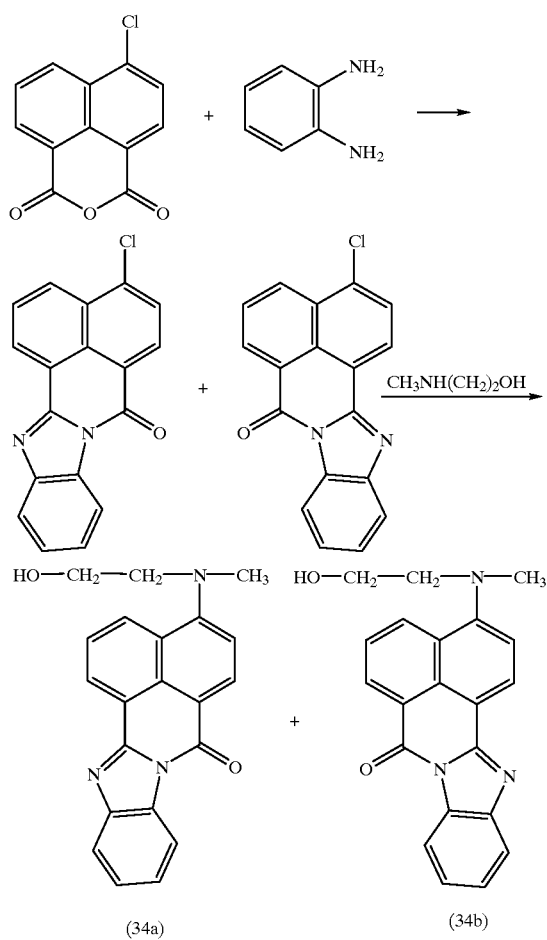

In this scheme, the 4/5-chloro-1,8-naphthoylene-1',2'-benzimidazole, which occurs as an isomeric mixture (approx. 3:1), is first produced by the reaction of 4-chloro-naphthalic anhydride and o-phenylenediamine. The 4/5-chloro-1,8-naphthoylene-1',2'-benzimidazole is then combined with 2-(methylamino)ethanol in the presence of a catalytic quantity of a copper(II) salt to form the desired 4/5-(N-methyl-N-hydroxyethyl)amino-1,8-naphthoylene-1',2'-benzimidazole.

The starting compounds of the formulae (VII), (VIII), (VIIa), (X) and (XI) for the production of the 1,8-naphthalimide derivatives according to the invention of the formulae (6a), (7a-1) and (7b-1) are common compounds in organic chemistry.

The compounds of the formulae (20), (21) and (22) which are also necessary for the production of the (co)polymers according to the invention are generally known compounds.

The (co)polymers according to the invention are distinguished by their luminescent properties and film-forming capacity and may be applied onto suitable substrates by casting, knife coating or spin coating. The products exhibit photoluminescence on irradiation both in solutions and as films. The (co)polymers of the present invention are suitable for the production of electroluminescent displays.

Depending upon the structure and production process of the (co)polymers according to the invention, the intensity of luminescence may purposefully be modified by varying the concentration of luminophore, colour hues may be influenced by the incorporation of luminophores with different emission spectra, the morphology and electrical properties of the polymer layers may be optimised by the introduction of suitable comonomer units.

The invention thus relates to the use of the (co)polymers described above in the luminescent layer of an electroluminescent device, which is characterised in that an electroluminescent layer is located between two electrodes, that at least one of the two electrodes is transparent in the visible range of the spectrum, that light in the frequency range of 200 to 2000 nm is emitted when a direct voltage in the range of 0.1 to 100 volts is applied, that one or more interlayers may additionally be arranged between the electroluminescent layer and the electrodes.

These interlayers are known from the literature (cf Adachi et al., *Appl. Phys. Lett.*, 57, 531 (1990)) and are described therein as HTL (hole transport layer) and ETL (electron transport layer). The purpose of such interlayers is inter alia to increase the intensity of electroluminescence.

The electroluminescent polymers according to the invention may, however, also be used in the electroluminescent layer as a mixture with each other or with at least one further material. This further material may be 1. an inert binder,
2. charge transporting substances as described in EP-A 532 798 or EP-A 564 224,
3. mixtures of inert binders and charge transporting substances.

The mixtures of the polymers according to the invention and a further material are distinguished inter alia that they are film-forming and may be applied in large areas onto suitable substrates by casting, knife coating or spin coating. Suitable substrates are transparent supports such as glass or plastic films (for example polyester, such as polyethylene terephthalate or polyethylene naphthalate, polycarbonate, polysulphone, polyimide films).

The inert binder preferably comprises soluble, transparent polymers, such as for example polycarbonates, polystyrene, polyvinylpyridine, polymethylphenylsiloxane and polystyrene copolymers such as SAN, polysulphones, polyacrylates, polyvinylcarbazole, polymers and copolymers of vinyl acetate and vinyl alcohol.

EXAMPLES

Example 1

Production of Copolymer According to Formula (27) (x:y=0.4:0.6)

1. Production of Copolymer According to Formula (25) (x:y=0.4:0.6) as a 79% Solution in Toluene A solution of 201 g (1.00 mol) of m-(2-isocyanatoprop-2-yl)-α-methylstyrene (23), 180 g (1.52 mol) of m/p-methylstyrene and 1.5 g (9.1 mmol) of AIBN in 100 g of dried toluene were added dropwise under nitrogen with stirring within 3 hours to a three-necked flask heated to 110° C. The polymerisation mixture is combined repeatedly with AIBN (total of 2 g) within a period of 16 hours at the same temperature. A colourless, viscous solution is obtained.

2. Production of 3-(6-hydroxyhexoxy carbonyl)-7-diethyl-aminocoumarin of the Formula (26)

A solution of bis-(6-hydroxyhexyl) malonate in 1,6-hexanediol is prepared on heating a mixture of 21.6 g (0.15 mol) of Meldrum's acid, 59 g (0.50 mol) of 1,6-hexanediol and 0.28 g (1.5 mmol) of p-toluene-sulphonic acid monohydrate for 2 hours at 140° C.

The resultant solution is then combined with 26.0 g (0.135 mol) of 4-diethylaminosalicylic aldehyde, 0.7 ml of piperidine and 0.1 ml of acetic acid. The reaction mixture is stirred for 3 hours at 110° C. and, once cool, is combined with 300 ml of water. The suspension is extracted with dichloromethane. The organic phase is evaporated and the residue recrystallised from toluene. 40.2 g (83%) of 3-(6-hydroxyhexoxycarbonyl)-7-diethylaminocoumarin are obtained as yellow crystals with a melting point of 85 to 86° C.

3. Production of Copolymer According to Formula (27) (x:y =0.4:0.6)

2 mg of dibutyltin dilaurate are added under nitrogen to a mixture of 3.0 g (approx. 6.2 mmol NCO group) of a 79% solution in toluene of the copolymer according to formula (25) (x:y =0.4:0.6) (example 1.1), 2.2 g (6.1 mmol) of 3-(6-hydroxyhexoxycarbonyl)-7-diethyl-aminocoumarin (26) and 15 ml of anhydrous toluene. The reaction mixture is stirred at 110° C., wherein the relative quantity of the bound and free dye is constantly monitored by thin layer chromatography until no distinct changes are observable. Once cool, the resultant viscous solution is precipitated from methanol. 4 g (87% of theoretical) of a pale yellow, blue-fluorescing solid are obtained.

Example 2
Production of Copolymer According to Formula (31) (x:y =0.05:0.95)

1. Production of Copolymer According to Formula (29) (x:y =0.05:0.95)

A solution of 0.5 g (2.49 mmol) of m-(2-isocyanato-prop-2-yl)-α-methylstyrene (23), 9.52 g (49.3 mmol) of N-vinylcarbazole (28) and 80 mg (0.49 mmol) of AIBN in 10 g of dried toluene are refluxed for 5 hours under nitrogen and with stirring. The solvent of the viscous polymerisation solution is removed under a vacuum with exclusion of moisture. 9.7 g (97% of theoretical) of colourless solid are obtained.

2. Production of N-(4-n-butylphenyl)-4-(N'-methyl-N'-hydroxyethyl)amino-1,8-naphthalimide of the Formula (30)

A mixture of 46.6 g (0.20 mol) of 4-chloro-1,8-naphthalic anhydride, 32.8 g (0.22 mol) of 4-n-butyl-aniline and 300 ml of acetic acid is stirred for 2 hours at 130° C. The solution is cooled to room temperature and then combined with 2 liters of water. The suspension is filtered and, after drying, 69 g (95% of theoretical) of 4-chloro-N-(4-n-butylphenyl)-1,8-naphthalimide are obtained as pale yellow crystals.

A mixture of 36.0 g (0.10 mol) of 4-chloro-N-(4-n-butylphenyl)-1,8-naphthalimide, 22.5 g (0.30 mol) of 2-(methylamino)ethanol, 2.0 g of copper(II) sulphate and 150 ml of ethylene glycol monomethyl ether is refluxed for two hours while being stirred. The solution is cooled to room temperature and then combined with 1 liter of water. The suspension is extracted with dichloromethane. The organic phase is evaporated and the residue recrystallised from toluene. 34 g (85%) of N-(4-n-butylphenyl)-4-(N'-methyl-N'-hydroxyethyl)amino-1,8-naphthalimide are obtained as brown crystals.

3. Production of Copolymer According to Formula (31) (x:y=0.05:0.95)

In a similar manner to the method described in example 1.3, 3.0 g (91% of theoretical) of a yellow, green-fluorescing solid are produced starting from 3.0 g (0.74 mmol NCO group) of the copolymer according to formula (29) (x:y =0.05:0.95) (example 2.1), 0.3 g (0.75 mmol) of N-(4-butylphenyl)-4-(N'-methyl-N'-hydroxyethy)amino-1,8-naphthalimide (30) at 45° C. with dried dichloromethane as the diluent.

Example 3
Production of Copolymer According to Formula (35) (x:y= 0.5:0.5)

1. Production of Copolymer According to Formula (33) (x:y =0.5:0.5) as a 50% solution in 1-methoxy-2-propyl acetate In a similar manner to the method described in example 1.1, the copolymer according to formula (33) (x:y=0.5:0.5) may be produced as a 50% solution in 1-methoxy-2-propyl acetate from 15.5 g (0.10 mol) of 2-isocyanatoethyl methacrylate (32), 19.3 g (0.10 mol) of N-vinylcarbazole (28), 0.32 g (2.0 mmol) of AIBN and 35 g of dried 1-methoxy-2-propyl acetate.

2. Production of 4/5-(N-methyl-N-hydroxyethyl)amino-1,8-naphthoylene-1',2'-benzimidazole of the Formula (34)

In a similar manner to the method according to example 2.2, an 87% yield of the 4/5-chloro-1,8-naphthoylene-1',2'-benzimidazole is obtained as yellow crystals with a melting point of 225 to 226° C. from 4-chloro-1,8-naphthalic anhydride and o-phenylenediamine.

In a similar manner to the method according to example 2.2, an 82% yield of 4/5-(N-methyl-N-hydroxyethyl)-amino-1,8-naphthoylene-1',2'-benzimidazole is obtained as red-brown crystals with a melting point of 168 to 169° C. from 4/5-chloro-1,8-naphthoylene-1',2'-benzimidazole and 2-(methylamino)ethanol.

3. Production of Copolymer According to Formula (35) (x:y=0.5:0.5)

In a similar manner to the method described in example 1.3, 2.9 g (84% of theoretical) of an orange, yellow-fluorescing solid may be produced starting from 3.5 g (approx. 5 mmol NCO group) of a 50% solution of the copolymer according to formula (33) (x:y=0.5:0.5) in 1-methoxy-2-propyl acetate (example 3.1), 1.71 g (5.0 mmol) of 4/5-(N-methyl-N-hydroxyethyl)amino-1,8-naphthaloylene-1',2'-benzimidazole (34).

Example 4
Production of Copolymer According to Formula (38) (x:y= 0.44:0.56)

1. Production of Copolymer According to Formula (36) (x:y=0.44:0.56) as a 76% solution in 1-methoxy-2-propyl acetate

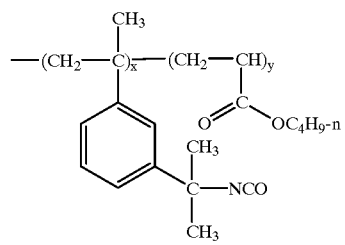

In a similar manner to the method described in example 1.1, the copolymer according to formula (36) (x:y= 0.44:0.56) may be produced as a 78% solution in 1-methoxy-2-propyl acetate from 201 g (1.00 mol) of m-(2-isocyanatoprop-2-yl)-α-methylstyrene (23), 160 g (1.25 mol) of butyl acrylate, 2.5 g (15 mmol) of AIBN and 100 g of dried 1-methoxy-2-propyl acetate.

2. Production of the 3-[(N-hydroxyethyl-N-methyl)aminocarbonyl]-7-diethylaminocoumarin of the formula (37)

A mixture of 19.3 g (0.10 mol) of 4-diethylaminosalicylic aldehyde and 19.2 g (0.12 mol) of diethyl malonate is stirred together with 30 ml of 2-(methyl-amino)ethanol, 0.3 ml of piperidine and 0.3 ml of acetic acid. The reaction mixture is stirred for 4 hours at 100° C. and, once cool, combined with 200 ml of water. The suspension is extracted with dichloro-methane. The organic phase is evaporated and the residue recrystallised from toluene. 25.4 g (80%) of 3-[(N-hydroxyethyl-N-methyl)aminocarbonyl]-7-diethylaminocoumarin are obtained as brown crystals of a melting point of 94.5 to 96.5° C.

3. Production of the Copolymer According to Formula (38) (x:y=0.44:0.56)

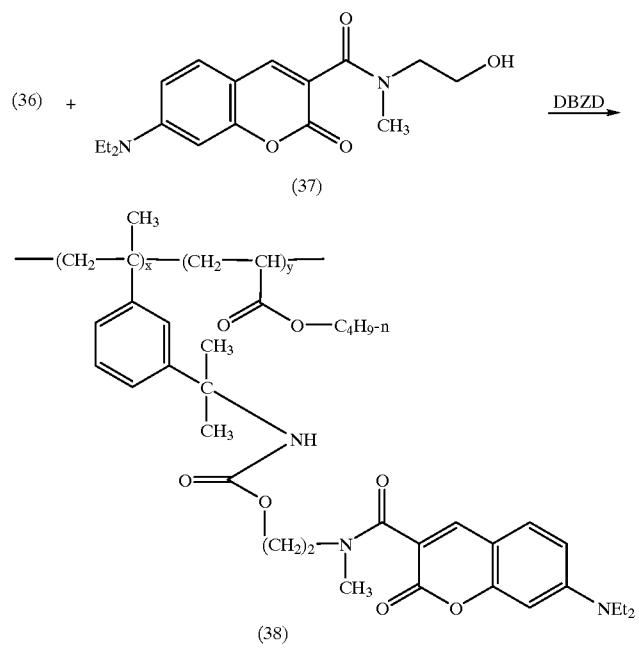

In a similar manner to the method described in example 1.3, 5.7 g (82% of theoretical) of a brown, blue-fluorescing solid may be produced starting from a 78% solution of the copolymer according to formula (36) (x:y=0.5:0.5) in 1-methoxy-2-propyl acetate (example 4.1), 3.18 g (10 mmol) of 3-(N-hydroxyethyl-N-methyl)-aminocarbonyl-7-diethylaminocoumarin (37).

Practical Example
Production of Electroluminescent Device from Copolymer (31) (x:y=0.05:0.95) (example 2.3)

ITO-coated glass (manufactured by Balzers) is cut into substrates of dimensions 20×30 mm and cleaned. Cleaning is performed in the following sequence of stages:
1. 15 minutes' rinsing in distilled water and Falterol in ultrasound bath,
2. 2×15 minutes' rinsing in ultrasound bath, each time with fresh distilled water,
3. 15 minutes' rinsing with ethanol in ultrasound bath,
4. 2×15 minutes' rinsing in ultrasound bath, each time with fresh acetone,
5. drying on lint-free lens cleaning cloths.

A 1% solution of the polymer according to formula (31) (x:y=0.05:0.95) in 1,2-dichloroethane is filtered (0.2 µm filter, Sartorius). The filtered solution is distributed on the ITO glass with a spin coater at 1000 rpm. The thickness of the dry film is 170 nm and the $R_a$ value of the surface is 10 nm (Alpha-Step 200 stylus profilometer from teter Tencor Inst.).

The film produced in this manner is then provided with A1 electrodes by vapour deposition. To this end, isolated 3 mm diameter dots of A1 are vapour-deposited onto the film using a perforated mask. A pressure of below $10^{-5}$ mbar prevails in the vapour deposition device (Leybold) during deposition.

The ITO layer and the A1 electrode are connected to an electrical supply via electrical supply lines. When the voltage is increased, an electric current flows through the device and the described layer electroluminesces in the yellow/green range of the spectrum. Electroluminescence here occurs irrespective of the polarity of the applied voltage.

We claim:

1. (Co)polymers which contain at least one repeat chain unit selected from the group consisting of units of general formula (1), (2) and (3),

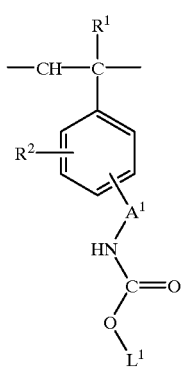

(1)

-continued

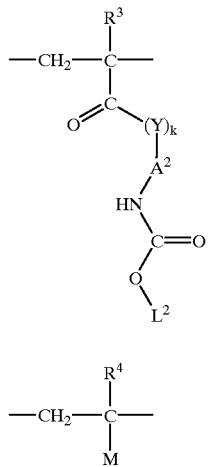
(2)

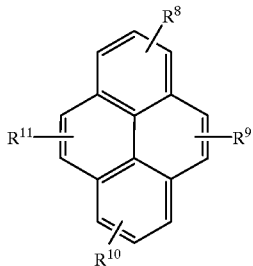
(3)

in which

R¹, R³ and R⁴ mutually independently mean hydrogen or $C_1$–$C_6$ alkyl,

R² means hydrogen, $C_1$–$C_{30}$ alkyl, $C_6$–$C_{18}$ aryl or $C_1$–$C_{30}$ alkoxy, M denotes CN, $C_1$–$C_{30}$ alkoxycarbonyl, $C_1$–$C_{30}$ (di)alkylaminocarbonyl or $C_1$–$C_{30}$ alkylcarbonyl, which may each be substituted by hydroxy or $C_1$–$C_6$ alkoxycarbonyl, and furthermore denotes phenyl, naphthyl, anthracenyl, pyridinyl or carbazolyl, which may each be substituted by residues selected from the group consisting of halogen, hydroxy, silyl, $C_1$–$C_{30}$ alkyl, $C_6$–$C_{18}$ aryl, $C_1$–$C_{30}$ alkoxy, $C_1$–$C_{30}$ alkoxycarbonyl, $C_1$–$C_{30}$ acyloxy, and $C_1$–$C_{30}$ alkylcarbonyl, Y represents oxygen, sulfur or —NR°— wherein R° means hydrogen or $C_1$–$C_6$-alkyl, k means 0 or 1, A¹ and A² mutually independently mean $C_6$–$C_{18}$ arylene or $C_1$–$C_{30}$ alkylene, the aliphatic carbon chain of which may be interrupted by one to three heteroatoms such as oxygen or sulphur and/or by one to two optionally $C_1$–$C_6$ alkyl-substituted phenylenes or naphthylenes and L¹ and L² mutually independently mean a photoluminescent residue.

2. (Co)polymers according to claim 1, wherein the proportion of structural units of the formula (3) is 0 to 99.5 mol. % and the proportion of structural units of the formula (1) and/or (2) is in each case 0.5 to 100 mol. % and the molar proportions of structural units of formulae (1), (2) and (3) add up to 100%.

3. (Co)polymers according to claim 1, in which L¹ and L² mutually independently denote a photoluminescent residue which is based on the skeleton of a fluorescent dye which is selected from the group consisting of coumarins of the formula (4)

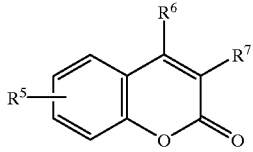
(4)

pyrenes of the formula (5)

(5)

1,8-naphthalimides of the formula (6)

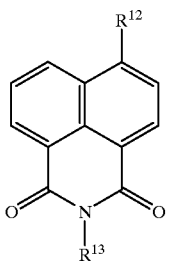
(6)

1,8-naphthaloylene-1',2'-benzimidazoles of the formula (7)

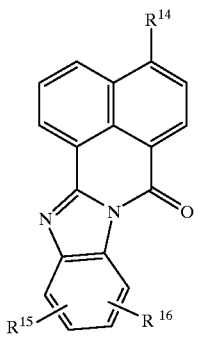
(7a)

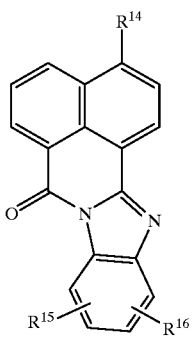

phenothiazines or phenoxazines of the formula (8)

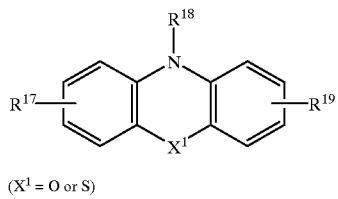

($X^1$ = O or S)

benzopyrones of the formula (9)

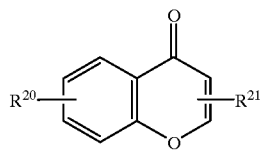

carbazoles, fluorenes, dibenzothiophenes and -furans of the formula (10)

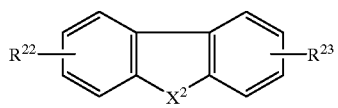

($X^2 = NR^{24}$, $CH_2$, S or O)

oxazoles, 1,3,4-oxadiazoles and 1,2,4-triazoles of the formula (11)

(11)

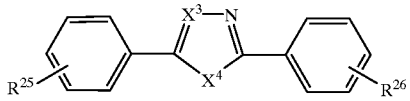

($X^3$ = CH or N, $X^4$ = O)

or ($X^3$ = N, $X^4$ = N—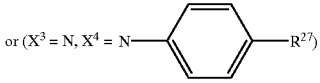

benzoquinolines of the formula (12)

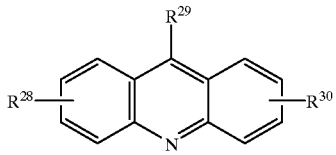

9,10-bis-(phenylethynyl)anthracenes of the formula (13)

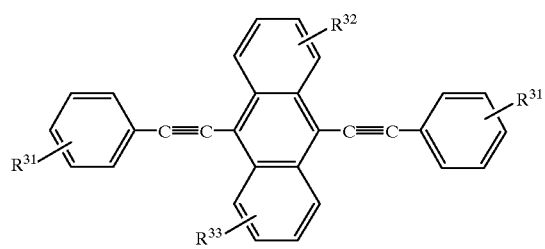

fluorones of the formula (14)

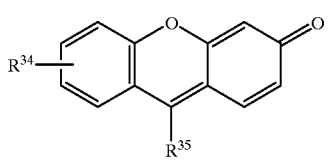

9,10-diphenylanthracene of the formula (15)

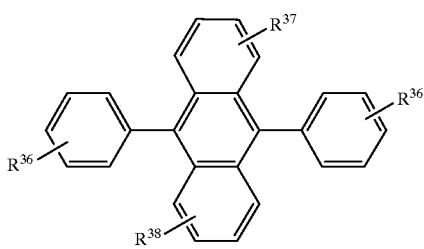

and 2-styrylbenzazole of the formula (16)

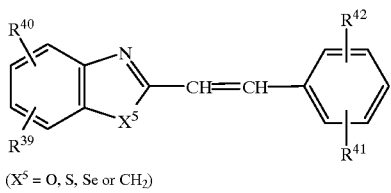

(16)

($X^5$ = O, S, Se or $CH_2$)

wherein $R^5$ denotes hydrogen, $C_1$–$C_{30}$ alkyl, $C_6$–$C_{18}$ aryl, $C_7$–$C_{24}$ aralkyl or —$NR^{43}R^{44}$, wherein $R^{43}$ and $R^{44}$ mutually independently denote $C_1$–$C_{30}$ alkyl, $C_6$–$C_{18}$ aryl, or $C_7$–$C_{24}$ aralkyl, or, together with the nitrogen atom to which they are attached, may mean a morpholine, piperidine, pyrrolidine or piperazine ring, which may bear one or two substituents selected from the group consisting of methyl, ethyl and phenyl, $R^6$ denotes hydrogen, cyano, $C_1$–$C_{30}$ alkyl, $C_6$–$C_{18}$ aryl, $C_7$–$C_{24}$ aralkyl, $C_1$–$C_{30}$ alkoxy, $C_1$–$C_{12}$ alkylcarbonyl, $C_1$–$C_{12}$ alkoxycarbonyl, or $C_1$–$C_{12}$ (di)alkylaminocarbonyl, $R^7$ denotes hydrogen, cyano, $C_1$–$C_{30}$ alkyl, $C_6$–$C_{18}$ aryl, $C_7$–$C_{24}$ aralkyl, $C_1$–$C_{30}$ alkoxy or

wherein $Z^1$ denotes a group $OR^{45}$ or

and $R^{45}$, $R^{46}$ and $R^{47}$ mutually independently denote $C_1$–$C_{30}$ alkyl, $C_6$–$C_{18}$ aryl or $C_7$–$C_{24}$ aralkyl, wherein the aromatic rings may additionally be substituted by halogen, $C_1$–$C_6$ alkyl and/or $C_1$–$C_6$ alkoxy, $R^8$ to $R^{10}$ mutually independently mean hydrogen, cyano, $C_1$–$C_{30}$ alkyl, $C_6$–$C_{18}$ aryl, $C_7$–$C_{24}$ aralkyl, $C_1$–$C_3$ alkoxy, $C_1$–$C_{12}$ alkylcarbonyl, $C_1$–$C_{12}$ alkoxycarbonyl or an amino group with one or two $C_1$–$C_6$ alkyl groups, $R^{11}$ denotes hydrogen, cyano, $C_1$–$C_{30}$ alkyl, $C_6$–$C_{18}$ aryl, $C_7$–$C_{24}$ aralkyl, $C_1$–$C_{30}$ alkoxy, amino, $C_1$–$C_{12}$ alkylcarbonyl, $C_1$–$C_{12}$ alkoxycarbonyl or $C_1$–$C_{12}$ (di)alkylaminocarbonyl, $R^{12}$ denotes hydrogen, halogen, nitro, $C_1$–$C_4$ alkylcarbonyl, $C_1$–$C_4$ alkoxycarbonyl, $C_8$–$C_{24}$ aralkenyl, unsubstituted amino, or amino identically or differently mono- or disubstituted by $C_1$–$C_{30}$ alkyl, $C_6$–$C_{18}$ aryl or $C_7$–$C_{24}$ aralkyl, $R^{12}$ furthermore denotes morpholinyl, piperidinyl, pyrrolidinyl or piperazinyl, which may bear one or two substituents selected from the group consisting of methyl, ethyl and phenyl, $R^{13}$ denotes hydrogen, $C_1$–$C_{30}$ alkyl, $C_6$–$C_{18}$ aryl, $C_7$–$C_{24}$ aralkyl or $C_1$–$C_{30}$ alkoxy, $R^{14}$ denotes hydrogen, $C_1$–$C_{30}$ alkyl, $C_6$–$C_{18}$ aryl, $C_7$–$C_{24}$ aralkyl, $C_1$–$C_{30}$ alkoxy or —$NR^{48}R^{49}$, wherein $R^{48}$ and $R^{49}$ mutually independently denote $C_1$–$C_{30}$ alkyl, $C_6$–$C_{18}$ aryl or $C_7$–$C_{24}$ aralkyl, or, together with the nitrogen atom to which they are attached, may mean a morpholine, piperidine, pyrrolidine or piperazine ring, which may bear one or two substituents selected from the group consisting of methyl, ethyl and phenyl, $R^{15}$ and $R^{16}$ mutually independently denote hydrogen, halogen, nitro, $C_1$–$C_{30}$ alkyl, $C_6$–$C_{18}$ aryl, $C_7$–$C_{24}$ aralkyl, $C_1$–$C_{12}$ alkylcarbonyl, $C_1$–$C_{12}$ alkoxycarbonyl, $C_1$–$C_{30}$ alkoxy, $C_1$–$C_{12}$ (di)alkylaminocarbonyl, or $C_1$–$C_6$ (di)alkylamino, $R^{18}$ and $R^{24}$ mutually independently denote hydrogen, $C_1$–$C_{30}$ alkyl, $C_6$–$C_{18}$ aryl or $C_7$–$C_{24}$ aralkyl and $R^{17}$, $R^{19}$ to $R^{23}$, $R^{25}$ to $R^{42}$ mutually independently denote hydrogen, cyano, $C_1$–$C_{30}$ alkyl, $C_6$–$C_{18}$ aryl, $C_7$–$C_{24}$ aralkyl, amino, $C_1$–$C_{12}$ alkylcarbonyl, $C_1$–$C_{12}$ alkoxycarbonyl, $C_1$–$C_{30}$ alkoxy, $C_1$–$C_{12}$ (di) alkylaminocarbonyl, or $C_1$–$C_6$ (di)alkylamino, wherein at least one hydroxy group is located on an aliphatic carbon chain or on an aromatic ring in one of the substituents $R^5$ to $R^{42}$ and the photoluminescent residue is attached to the polymer side chains by the reaction of this hydroxy group with an isocyanate group on residue $A^1$ or $A^2$ so forming a urethane group (—NH—COO—), and further wherein the aliphatic carbon chain may be interrupted by one to three heteroatoms selected from the group consisting of oxygen, sulphur and nitrogen and/or by one to two phenylenes or naphthylenes optionally substituted with $C_1$–$C_6$-alkyl.

4. (Co)polymers according to claim 1, wherein $R^1$, $R^3$ and $R^4$ mutually independently mean hydrogen, methyl or ethyl, $R^2$ means hydrogen, $C_1$–$C_6$ alkyl or phenyl optionally substituted by methyl, ethyl, n-propyl and/or iso-propyl, M denotes CN, $C_1$–$C_{15}$ alkoxycarbonyl, $C_1$–$C_{15}$ (di) alkylaminocarbonyl, or $C_1$–$C_{15}$ alkylcarbonyl, which may each be substituted by hydroxy, methoxycarbonyl, ethoxycarbonyl n- and/or iso-propoxycarbonyl, and furthermore denotes phenyl, naphthyl, anthracenyl, pyridinyl, or carbazolyl, which may each be substituted by residues selected from the group consisting of halogen, hydroxy, silyl, $C_1$–$C_6$ alkyl, $C_1$–$C_6$ alkoxy, $C_1$–$C_6$ alkoxycarbonyl, $C_1$–$C_6$ acyloxy, $C_1$–$C_6$ alkylcarbonyl and phenyl optionally substituted by methyl, ethyl, n- and/or iso-propyl, Y represents oxygen, sulfur or —$NR^o$—, wherein $R^o$ means hydrogen or $C_1$–$C_4$-alkyl, k means 0 or 1, $A^1$ and $A^2$ mutually independently mean $C_6$–$C_{12}$ arylene or $C_1$–$C_{12}$ alkylene, the carbon chain of which may be interrupted by one to three heteroatoms such as O or S and/or by one to two phenylenes or naphthylenes optionally with $C_1$–$C_6$ alkyl substituents, $L^1$ and $L^2$ mutually independently denote a residue of a fluorescent dye selected from the group consisting of coumarins of the formula (4), pyrenes of the formula (5), 1,8-naphthalimides of the formula (6), 1,8-naphthaloylene-1',2'-benzimidazoles of the formula (7), phenothiazines or phenoxazines of the formula (8), and carbazoles or fluorenes of the formula (10).

5. (Co)polymers having formula (35)

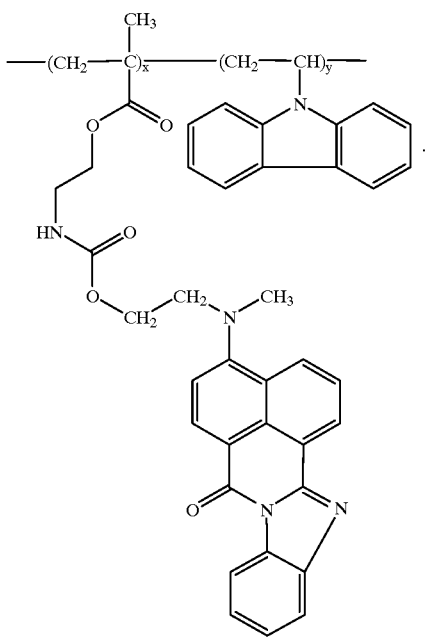

6. (Co)polymers according to claim 3, in which L¹ or L² is a photoluminescent residue which has the structure

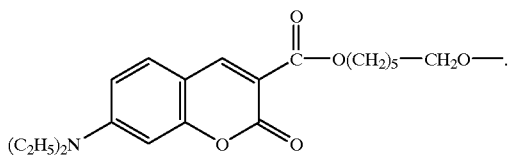

7. (Co)polymers according to claim 3, in which L¹ or L² is a photoluminescent residue which has the structure

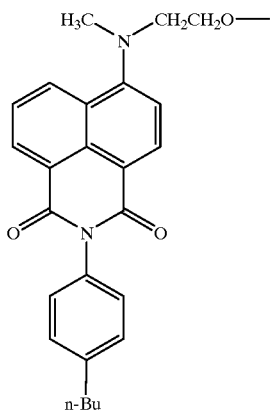

wherein Bu=a butyl group 8. (Co)polymers according to claim 3, in which L¹ or L² is a photoluminescent residue which has the structure

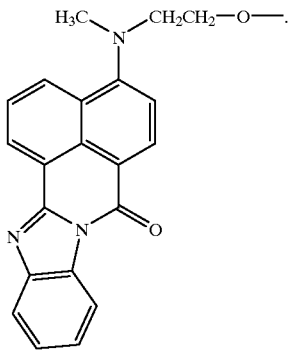

9. (Co)polymers according to claim 3, in which L¹ or L² is a photoluminescent residue which has the structure

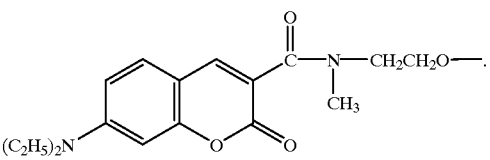

10. (Co)polymers according to claim 3, in which L¹ or L² is a photoluminescent residue which has the structure

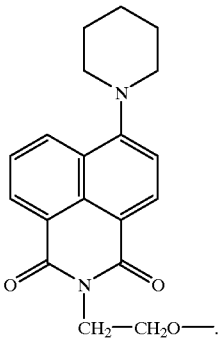

11. (Co)polymers according to claim 3, in which L¹ or L² is a photoluminescent residue which has the structure

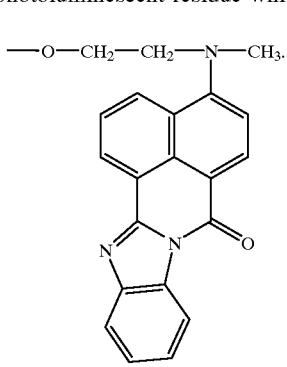

12. (Co)polymers according to claim 3, in which L¹ or L² is a photoluminescent residue which has the structure

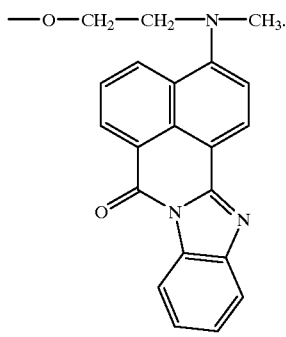

13. (Co)polymers according to claim 3, in which $L^1$ or $L^2$ is a photoluminescent residue which is based on the skeleton of a fluorscent dye having the following formula (4a)

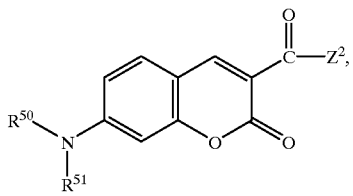

(4a)

wherein $R^{50}$ and $R^{51}$ mutually independently denote hydrogen, $C_1$–$C_{30}$ alkyl, $C_6$–$C_{18}$ aryl or $C_6$–$C_{24}$ aralkyl, which may each be substituted by hydroxy, amino, carboxy and/or $C_1$–$C_4$ alkoxycarbonyl or $R^{50}$ and $R^{51}$, together with the nitrogen atom to which they are attached, may mean a morpholine, piperidine, pyrrolidine or piperazine ring, which may bear one or two substituents from the group methyl, ethyl and phenyl, and $Z^2$ denotes a group $OR^{52}$ or —$NR^{53}R^{54}$, wherein $R^{52}$ means $C_1$–$C_{30}$ alkyl, $C_6$–$C_{18}$ aryl or $C_6$–$C_{24}$ aralkyl, which are each substituted by at least one hydroxy group and wherein the aromatic rings may additionally be substituted by halogen, $C_1$–$C_6$ alkyl and/or $C_1$–$C_6$ alkoxy and $R^{53}$ and $R^{54}$ mutually independently denote $C_1$–$C_{30}$ alkyl, $C_6$–$C_{18}$ aryl, $C_6$–$C_{24}$ aralkyl, each optionally hydroxy-substituted, wherein at least one of the residues $R^{53}$ and $R^{54}$ has a hydroxy group and wherein the aromatic rings may additionally be substituted by halogen, $C_1$–$C_6$ alkyl and/or $C_1$–$C_6$ alkoxy, further wherein the fluorescent dye of formula (4a) comprises a hydroxy group and the photoluminescent residue is attached to the polymer side chains by the reaction of the hydroxy group with an isocyanate group on residue $A^1$ or $A^2$ so forming a urethane group (—NH—COO—).

14. (Co)polymers according to claim 3, in which $L^1$ or $L^2$ is a photoluminescent residue which is based on the skeleton of a fluorescent dye having the following formula (7a-1) or formula

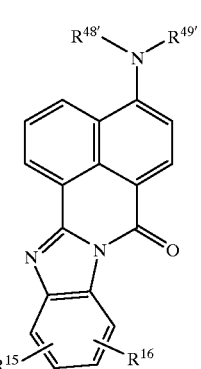

(7a-1)

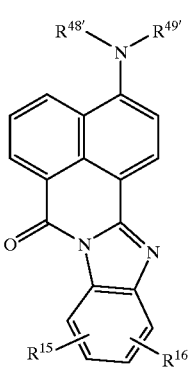

(7b-1)

wherein $R^{48'}$ and $R^{49'}$ mutually independently denote $C_1$–$C_{30}$ alkyl, $C_6$–$C_{18}$ aryl, $C_6$–$C_{24}$ aralkyl, which may be substituted by hydroxy, or $R^{48'}$ and $R^{49'}$, together with the nitrogen atom to which they are attached, moreover denote morpholinyl, piperidinyl, pyrrolidinyl or piperazinyl, which may bear one or two identical or different substituents selected from methyl, ethyl and phenyl, wherein at least one of the residues $R^{4'}$ and $R^{49'}$ has a hydroxy group, and the photoluminescent residue is attached to the polymer side chains by the reaction of the hydroxy group with an isocyanate group on residue $A^1$ or $A^2$ so forming a urethane group (—NH—COO—).

* * * * *